US011929225B2

(12) United States Patent
Lu et al.

(10) Patent No.: US 11,929,225 B2
(45) Date of Patent: Mar. 12, 2024

(54) MINIATURE CIRCUIT BREAKER

(71) Applicant: ZHEJIANG CHINT ELECTRICS CO., LTD., Zhejiang (CN)

(72) Inventors: Kejun Lu, Zhejiang (CN); Xiangyi Gu, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 312 days.

(21) Appl. No.: 17/418,321

(22) PCT Filed: Dec. 24, 2019

(86) PCT No.: PCT/CN2019/127765

§ 371 (c)(1),
(2) Date: Jun. 25, 2021

(87) PCT Pub. No.: WO2020/135386

PCT Pub. Date: Jul. 2, 2020

(65) Prior Publication Data

US 2021/0391135 A1 Dec. 16, 2021

(30) Foreign Application Priority Data

Dec. 28, 2018 (CN) ........................ 201811621795.2

(51) Int. Cl.
*H01H 71/58* (2006.01)
*H01H 9/20* (2006.01)
*H01H 71/02* (2006.01)
*H01H 71/10* (2006.01)

(52) U.S. Cl.
CPC .............. *H01H 71/58* (2013.01); *H01H 9/20* (2013.01); *H01H 71/0207* (2013.01); *H01H 71/1009* (2013.01)

(58) Field of Classification Search
CPC ........ H01H 9/20; H01H 9/24; H01H 71/0207; H01H 71/1009; H01H 71/58
See application file for complete search history.

(56) References Cited

U.S. PATENT DOCUMENTS 4,513,275 A 4/1985 Jullien ............................ 337/66
4,864,268 A 9/1989 Peter ............................... 337/70
(Continued)

FOREIGN PATENT DOCUMENTS

CN 106710975 A 5/2017
CN 107993900 A 5/2018
(Continued)

OTHER PUBLICATIONS

International Search Report dated Mar. 23, 2020 in corresponding PCT International Application No. PCT/CN2019/127765.
(Continued)

*Primary Examiner* — Jacob R Crum
(74) *Attorney, Agent, or Firm* — OSTROLENK FABER LLP

(57) ABSTRACT

A miniature circuit breaker, which includes a button mechanism, a circuit breaker housing, and an anti-switching-on mechanism, wherein the button mechanism is arrange at one end of the circuit breaker housing and is in sliding fit with the circuit breaker housing, the anti-switching-on mechanism includes a first locking member, the first locking member is pivotally arranged on the circuit breaker housing, one end of the first locking member is in locking fit with the button mechanism to prevent the button mechanism from moving towards a switching-on direction, and after the miniature circuit breaker is installed to an installed position for the circuit breaker, an external housing of the installed position for the circuit breaker acts on the first locking member, so that after the first locking member is unlocked from the button mechanism, the button mechanism is capable of moving towards the switching-on direction for a switching-on operation.

10 Claims, 11 Drawing Sheets

(56) References Cited

U.S. PATENT DOCUMENTS

| | | | | |
|---|---|---|---|---|
| 5,936,214 | A | 8/1999 | Phillips | 200/43.22 |
| 9,437,385 | B1 * | 9/2016 | Mittelstadt | H01H 71/0264 |
| 9,564,741 | B1 * | 2/2017 | Mittelstadt | H01H 71/08 |
| 9,589,743 | B2 * | 3/2017 | Lu | H01H 3/46 |
| 2007/0034495 | A1 * | 2/2007 | Christmann | H01H 71/526 200/400 |
| 2011/0089006 | A1 * | 4/2011 | Wan | H01H 71/526 200/323 |
| 2014/0353133 | A1 * | 12/2014 | Roehrig | H01H 13/02 200/318 |
| 2015/0255228 | A1 * | 9/2015 | Lu | H01H 3/38 218/154 |
| 2017/0018910 | A1 * | 1/2017 | Mittelstadt | H01H 71/08 |

FOREIGN PATENT DOCUMENTS

| | | | |
|---|---|---|---|
| CN | 207624637 | U | 7/2018 |
| CN | 207624641 | U | 7/2018 |
| CN | 109599303 | A | 4/2019 |
| CN | 109637907 | A | 4/2019 |
| CN | 109686625 | A | 4/2019 |
| CN | 109686626 | A | 4/2019 |
| CN | 109727826 | A | 5/2019 |
| CN | 109786186 | A | 5/2019 |
| CN | 209418443 | U | 9/2019 |
| CN | 209418445 | U | 9/2019 |
| CN | 209487441 | U | 10/2019 |
| CN | 209487450 | U | 10/2019 |
| CN | 209487451 | U | 10/2019 |
| CN | 209544266 | U | 10/2019 |
| CN | 209708923 | U | 11/2019 |

OTHER PUBLICATIONS

Written Opinion dated Mar. 23, 2020 in corresponding PCT International Application No. PCT/CN2019/127765.

Extended European Search Report dated Jul. 26, 2022, issued in corresponding European Patent Application No. 19904850.5.

* cited by examiner

MINIATURE CIRCUIT BREAKER

CROSS-REFERENCE TO RELATED APPLICATIONS

The present application is a 35 U.S.C. §§ 371 national phase conversion of International Application No. PCT/CN2019/127765, filed Dec. 24, 2019, which claims priority to Chinese Patent Application No. 201811621795.2, filed Dec. 28, 2018, the contents of both of which are incorporated herein by reference. The PCT International Application was published in the Chinese language.

TECHNICAL FIELD

The present invention relates to the field of low-voltage electric appliances, and more particularly, to a miniature circuit breaker.

BACKGROUND ART

The use of a circuit breaker can effectively improve a safety and a reliable operation of an electric device. In order to meet the installation needs of different electric devices, a miniature circuit breaker, as an important type of circuit breaker, has various structures and tends to be miniaturized as a whole. An existing miniature circuit breaker has the following problems.

1. When the miniature circuit breaker is not installed in place, a switching-on operation may bring a great potential safety hazard. Moreover, the existing miniature circuit breaker does not have an anti-switching-on mechanism and cannot indicate whether the circuit breaker is installed in place.

2. The existing miniature circuit breakers which are switched off/on by a button mechanism are all switched on by pressing the button mechanism, and switched off by pulling the button mechanism. However, if a pulling force of a user is too large during switching off, the miniature circuit breaker will be pulled out by mistake from an installed position for the circuit breaker, which is not conducive to ensuring a reliability and a working stability of the assembly of the miniature circuit breaker, and also has a potential safety hazard.

SUMMARY OF THE INVENTION

The present invention aims to overcome the defects of the prior art, and provides a miniature circuit breaker, an anti-switching-on mechanism thereof ensures that the miniature circuit breaker is capable of being switched on only after being installed in place to an installed position for the circuit breaker, thus ensuring a use safety.

In order to achieve the above objective, the technical solutions used in the present invention are as follows.

A miniature circuit breaker, comprising a button mechanism, a circuit breaker housing, and an anti-switching-on mechanism, wherein the button mechanism is arranged at one end of the circuit breaker housing and is in sliding fit with the circuit breaker housing, the anti-switching-on mechanism comprises a first locking member, the first locking member is pivotally arranged on the circuit breaker housing, one end of the first locking member is in locking fit with the button mechanism to prevent the button mechanism from moving towards a switching-on direction, and after the miniature circuit breaker is installed in place to an installed position for the circuit breaker, an external housing of the installed positon for the circuit breaker acts on the first locking member, so that after the first locking member is unlocked from the button mechanism, the button mechanism is capable of moving towards the switching-on direction for a switching-on operation.

Preferably, the button mechanism comprises a button head, a button body, and a first connecting rod, the button head is located on one side of the button body for a user to operate the button mechanism, the first connecting rod is in transmission connection with the button body, one end of the first connecting rod is inserted into the button body, one end of the first locking member is in locking fit with one end of the first connecting rod inserted on the button body, which prevents the button mechanism from moving towards the switching-on direction, and when the anti-switching-on mechanism is unlocked from the first connecting rod, the button mechanism is capable of moving towards the switching-on direction and performing the switching-on operation.

Preferably, further comprising an operating mechanism, a moving contact, and a static contact, wherein the other end of the first connecting rod is connected with the operating mechanism, the button body is drivingly connected with the operating mechanism through the first connecting rod, after the first locking member is unlocked from the first connecting rod, the button mechanism is pressed to move towards the switching-on direction, and the button mechanism drives the operating mechanism to act through the first connecting rod, thus connecting the moving contact with the static contact.

Preferably, the first connecting rod is a U-shaped rod, a transmission rod installation table is arranged on the button body, one end of the first connecting rod passes through the transmission rod installation table and forms a first transmission rod protruding from one side of the transmission rod installation table, and the first locking member is in locking fit with the first transmission rod.

Preferably, the anti-switching-on mechanism further comprises a first locking spring, the first locking member comprises a first locking member body, and a first locking member protrusion and a first locking member stop arm which are respectively arranged at two ends of the first locking member body, the first locking member body is pivotally arranged on the circuit breaker housing, the circuit breaker housing comprises a first opening hole arranged in one side thereof, the first locking spring makes the first locking member stop arm in locking fit with the first connecting rod, and makes the first locking member protrusion pass through the first opening hole and protrude outside the circuit breaker housing, and after the miniature circuit breaker is installed in place to the installed position for the circuit breaker, the external housing of the installed position for the circuit breaker presses the first locking member protrusion to move into the circuit breaker housing, so that the first locking member stop arm is unlocked from the first connecting rod.

Preferably, further comprising a locking mechanism, wherein the locking mechanism comprises a second locking member and a second locking spring, the second locking member comprises a second locking member body, and a second locking member protrusion and a second locking member driving arm which are respectively arranged at two ends of the second locking member body, the second locking member body is pivotally installed on the circuit breaker housing, the circuit breaker housing comprises a second opening hole arranged in one side thereof, the second locking member driving arm is in driving fit with the first connecting rod, the second locking spring makes the second locking member protrusion pass through the second opening hole and protrude outside the circuit breaker housing, after the miniature circuit breaker is installed in place to the installed position for the circuit breaker, the second locking member protrusion passes through the second opening hole and is in limit fit with the external housing of the installed position for the circuit breaker, when the button mechanism is pulled to move out of the circuit breaker housing, the first connecting rod drives the second locking member driving arm to rotate, so that the second locking member protrusion moves into the circuit breaker housing, and the second locking member is released from the external housing of the installed position for the circuit breaker.

Preferably, the first locking member body and the second locking member body of the first locking member are arranged side by side, and the first locking member and the second locking member are both pivotally installed on the circuit breaker housing through a first pivot.

Preferably, further comprises a first installation shaft, wherein the first locking spring and the second locking spring of the anti-switching-on mechanism are double torsion springs with an integrated structure, the double torsion springs are sleeved on the first installation shaft, and comprise first ends of the double torsion springs connected with the first locking member body, second ends of the double torsion springs connected with the second locking member body, and third ends of the double torsion springs connected with the circuit breaker housing; the first locking member comprises a first locking spring limit protrusion arranged on one side of the first locking member body, the second locking member comprises a second locking spring limit protrusion arranged on one side of the second locking member body, the first ends of the double torsion springs are in limit fit with the first locking spring limit protrusion, and the second ends of the double torsion springs are in limit fit with the second locking spring limit protrusion.

Preferably, a first limit boss is also arranged on the button body, and the first limit boss is in contact fit with the circuit breaker housing.

Preferably, the operating mechanism comprises a transmission member, a second connecting rod, a catch member, a supporting member, a buckle member, and a first reset spring, the transmission member and the supporting member are pivotally arranged on the circuit breaker housing respectively, the supporting member is elastically connected with the circuit breaker housing through the first reset spring, the catch member and the buckle member are pivotally arranged on the supporting member respectively, the button mechanism is drivingly connected with the transmission member through the first connecting rod, the transmission piece is drivingly connected with the catch member through the second connecting rod, the catch member is in catch fit with the buckle member, the buckle member is in driving fit with the supporting member, and the supporting member is connected with the moving contact.

Preferably, the operating mechanism further comprises a switching-off rod, the switching-off rod comprises a switching-off rod connecting end and a switching-off rod driving end, the switching-off rod connecting end is connected with the button mechanism, and the switching-off rod driving end is in driving fit with the buckle member; when the miniature circuit breaker is in an switching-off state, the catch member is in catch fit with the buckle member, the button mechanism is pressed, so that the operating mechanism drives the moving contact to be connected with the static contact, the miniature circuit breaker enters the switching-on state, the button mechanism is pressed again, the switching-off rod driving end drives the buckle to rotate, so that the buckle member is unlocked from the catch member, the operating mechanism is buckled, the supporting member drives the moving contact to be disconnected from the static contact, and the miniature circuit breaker enters a switching-off state.

Preferably, the operating mechanism further comprises a button mechanism reset member, and a guide boss and a guide groove set which are matched with the switching-off rod and arranged on the circuit breaker housing; the guide groove set comprises a first guide groove, a second guide groove, a third guide groove, a fourth guide groove, and a fifth guide groove, and the first guide groove, the second guide groove, the third guide groove, the fourth guide groove, and the fifth guide groove are connected end to end to form the annular guide groove set surrounding the guide boss;

when the miniature circuit breaker is in the switching-off state, the button mechanism is pressed, the switching-off rod driving end of the switching-off rod passes through the first guide groove and then the second guide groove to enter the third guide groove, the miniature circuit breaker enters the switching-on state, the button mechanism is released, the button mechanism reset member drives the switching-off rod driving end to pass through the third guiding groove to enter the fourth guiding groove through the button mechanism, and the switching-off rod driving end is in limit fit with the guide boss; and the button mechanism is pressed again, the button mechanism drives the buckle member to rotate through the switching-off rod driving end, the buckle member is unlocked from the catch member, the operating mechanism is buckled, the operating mechanism drives the button mechanism to reset, the button mechanism drives the switching-off driving end to pass through the fourth guide groove and then the fifth guide groove to enter the first guide groove, so that the miniature circuit breaker enters the switching-off state.

According to the miniature circuit breaker of the present invention, the anti-switching-on mechanism thereof ensures that the miniature circuit breaker is capable of being switched on only after being installed in place, thus avoiding a situation that the circuit breaker cannot work normally due to poor contact caused by improper installation of the miniature circuit breaker, avoiding a situation that the miniature circuit breaker is in false contact with the installed position for the circuit breaker, and when the circuit breaker is switched on, an electric arc is generated, which causes ablation to the circuit breaker or the installed position for the circuit breaker, and affects a service life, and avoiding electric shock of a user when operating the circuit breaker, which is conductive to improving a safety of electricity consumption. In addition, according to the miniature circuit breaker of the present invention, the circuit breaker may be switched on/off by pressing the button mechanism.

DETAILED DESCRIPTION OF THE PREFERRED EMBODIMENTS

Figure 1:
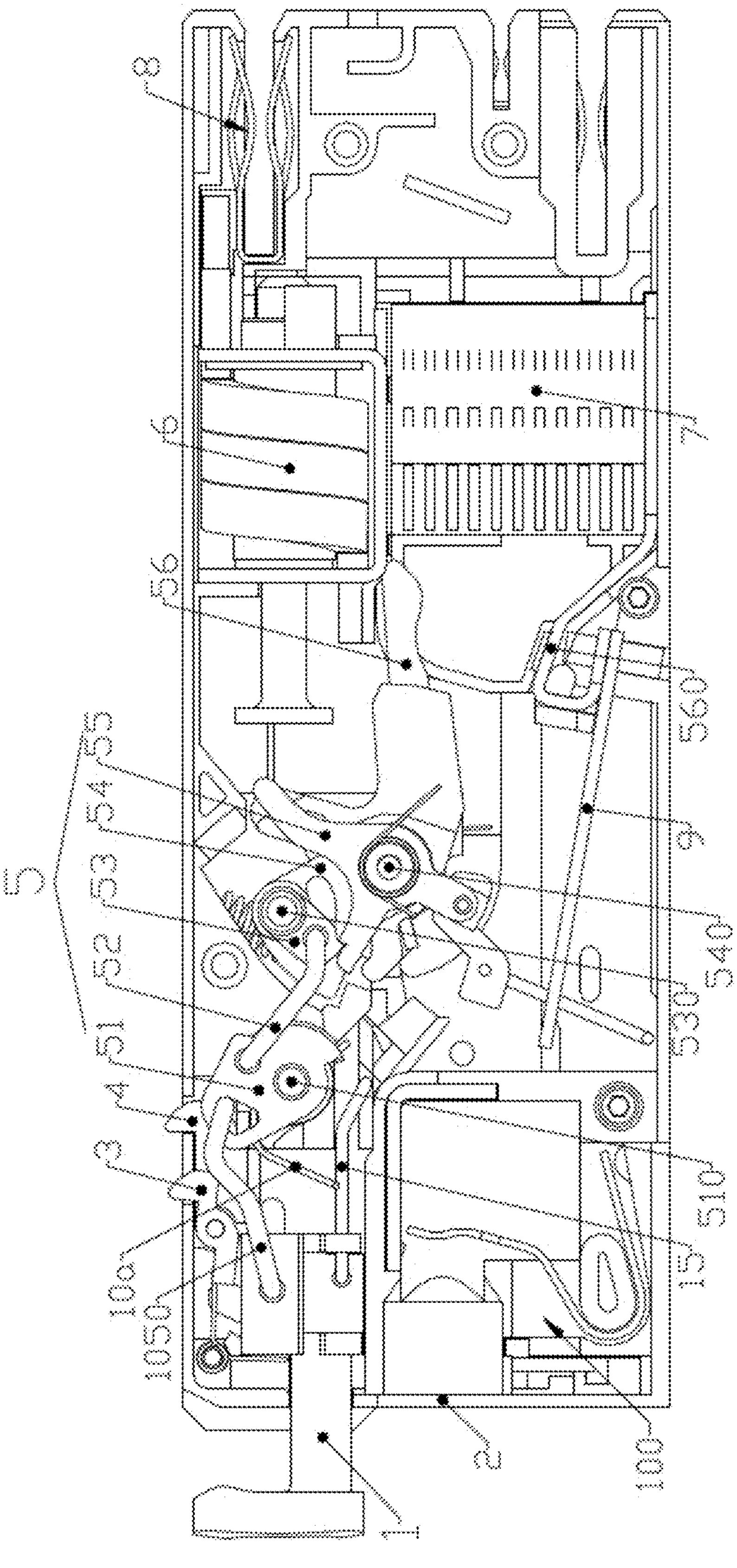
FIG. 1 is a schematic structural diagram of a miniature circuit breaker of the present invention.

The specific implementations of a miniature circuit breaker of the present invention are further described hereinafter with reference to the embodiments shown in FIG. 1 to FIG. 19. The miniature circuit breaker of the present invention is not limited to the descriptions in the following embodiments.

The miniature circuit breaker of the present invention includes a circuit breaker housing 2, a button mechanism 1 arranged on the circuit breaker housing 2 and in sliding fit with the circuit breaker housing, and an operating mechanism 5, a moving contact 56, a static contact 560, a short circuit protection mechanism 6, an arc extinguishing mechanism 7, and an overload protection mechanism 9 which are arranged in the circuit breaker housing 2. The button mechanism 1 is drivingly connected with the operating mechanism 5 through the first connecting rod 1050, and the operating mechanism 5 is connected with the moving contact 56. The short circuit protection mechanism 6 and the overload protection mechanism 9 are in driving fit with the operating mechanism 5 respectively to trigger releasing of the circuit breaker when corresponding faults occur, and the arc extinguishing mechanism 7 is matched with the moving contact 56 and the static contact 560 for use.

Preferably, the short circuit protection mechanism 6 includes an electromagnetic release, and the overload protection mechanism 9 includes a bimetallic strip and an adjusting screw.

Preferably, as shown in FIG. 1, the button mechanism 1 is arranged at one end of the circuit breaker housing 2, and the short circuit protection mechanism 6 and the arc extinguishing mechanism 7 are both arranged at the other end of the circuit breaker housing 2. The operating mechanism 5 is arranged between the button mechanism 1 and the short circuit protection mechanism 6, and the overload protection mechanism 9 is arranged on one side of the operating mechanism 5 and is located between the arc extinguishing mechanism 7 and the button mechanism 1. Further, as shown in FIG. 1, the miniature circuit breaker of the present invention further includes an outlet end 100 and an inlet end 8. The outlet end 100 is arranged on one side of the button mechanism 1, and the outlet end 100 and the button mechanism 1 are located at a same end of the circuit breaker housing 2. The inlet end 8 is arranged on one side of the short circuit protection mechanism 6 and the arc extinguishing mechanism 7, and the inlet end 8, the short circuit protection mechanism 6, and the arc extinguishing mechanism 7 are located at a same end of the circuit breaker housing 2. The inlet end 8 is a plug-in wiring terminal. Specifically, in a direction shown in FIG. 1, the button mechanism 1 and the outlet end 100 are located at an upper end of the circuit breaker housing 2, and the outlet end 100 is located on a left side of the button operating mechanism 1. The operating mechanism 5 and the overload protection mechanism 9 are located in a middle portion of the circuit breaker housing 2, and the overload protection mechanism 9 is located on a left side of the operating mechanism 5. The short circuit protection mechanism 6, the arc extinguishing mechanism 7, and the inlet end 8 are located at a lower end of the circuit breaker housing 2, and the inlet end 8 is located on a lower side of the short circuit protection mechanism 6 and the arc extinguishing mechanism 7. Thus it can be seen that, according to the miniature circuit breaker of the present invention, the circuit breaker housing 2 thereof is reasonably planned and distributed, which not only ensures reasonable layout and organic matching of various mechanisms or components, but also makes full use of a space of the circuit breaker housing 2, thus being conductive to reducing an overall volume of the miniature circuit breaker, so as to adapt to a miniaturization development trend of electric devices and reduce installation space requirements of the circuit breaker. Moreover, the outlet end 100 and the button mechanism 1 are located at a same end of the circuit breaker housing 2, which is convenient for a user to connect and disconnect wire for the circuit breaker. The inlet end 8 is the plug-in wiring terminal, which is convenient for connecting the circuit breaker with a main circuit. An installation cabinet for installing the circuit breaker does not need to be disassembled during inlet wiring and outlet wiring, thus significantly improving convenience of wiring, and being conducive to improving an operation safety.

Figure 4:
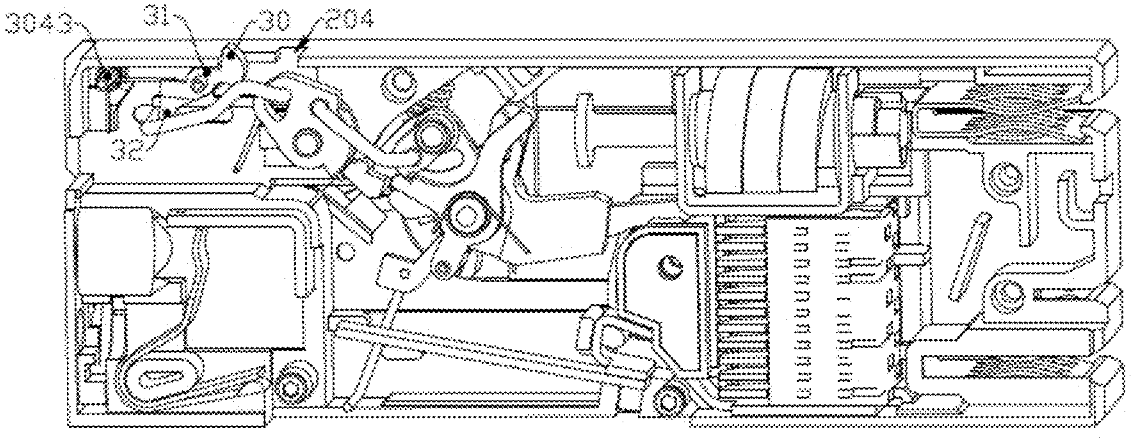
FIG. 4 is a schematic structural diagram of the miniature circuit breaker of the present invention, which shows an assembly relationship between an anti-switching-on mechanism and a circuit breaker housing.
Figure 5:
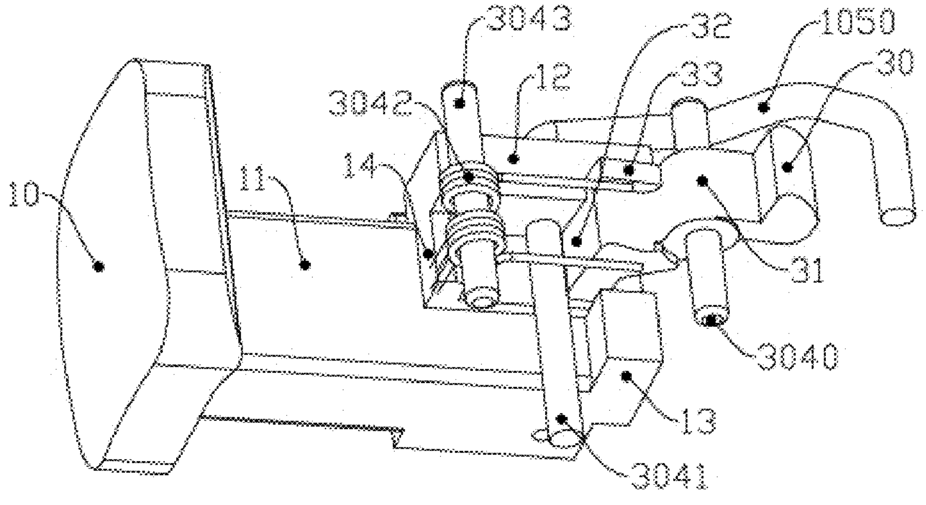
FIG. 5 is a schematic structural diagram of assembly of the button mechanism and the anti-switching-on mechanism of the present invention.

Preferably, as shown in FIG. 4 and FIG. 5, the miniature circuit breaker of the present invention further includes an anti-switching-on mechanism. The button mechanism 1 is arranged at one end of the circuit breaker housing 2 and is in sliding fit with the circuit breaker housing. The anti-switching-on mechanism includes a first locking member 3, the first locking member 3 is pivotally arranged on the circuit breaker housing 2, and one end of the first locking member 3 is in catch fit with the button mechanism 1 to prevent the button mechanism 1 from moving towards a switching-on direction. After the miniature circuit breaker is installed in place to the installed position for the circuit breaker, the external housing of the installed position for the circuit breaker acts on the first locking member 3, so that after the first locking member 3 is unlocked from the button mechanism 1, the button mechanism 1 is capable of moving towards the switching-on direction for a switching-on operation. The anti-switching-on mechanism ensures that the miniature circuit breaker is capable of being switched on only after being installed in place, thus avoiding a situation that the circuit breaker cannot work normally due to poor contact caused by improper installation of the miniature circuit breaker, and avoiding a situation that the miniature circuit breaker is in false contact with the installed position for the circuit breaker. When the switching-on operation is performed, an electric arc is generated, which causes ablation to the circuit breaker or the installed position for the circuit breaker, thus affecting a service life, avoiding electric shock of a user when operating the circuit breaker, and being conductive to improving a safety of electricity consumption.

Preferably, as shown in FIG. 4 and FIG. 5, the anti-switching-on mechanism further includes a first locking spring. The first locking member 3 includes a first locking member body 31, and a first locking member protrusion 30 and a first locking member stop arm 32 which are respectively arranged at two ends of the first locking member body 31. The first locking member body 31 is pivotally arranged on the circuit breaker housing 2, the first locking member stop arm 32 is connected with the first locking member body 31 in a bent manner, and the circuit breaker housing 2 includes a first opening hole 203 arranged in one side thereof. The first locking spring is respectively connected with the first locking member 3 and the circuit breaker housing 2 to make the first locking member stop arm 32 in locking fit with the button mechanism 1, and make the first locking member protrusion 30 pass through the first opening hole 203 and protrude outside the circuit breaker housing 2. After the miniature circuit breaker is installed in place to the installed position for the circuit breaker, the external housing of the installed position for the circuit breaker squeezes the first locking member protrusion 30 to move the first locking member protrusion into the circuit breaker housing 2, so that the first locking member stop arm 32 is unlocked from the button mechanism 1.

It should be pointed out that the locking fit between the button mechanism 1 and the first locking member stop arm 32 refers to that the button mechanism 1 cannot act towards the switching-on direction (the direction shown in FIG. 1, the switching-on direction refers to a downward direction) after being locked, but after being unlocked, the button mechanism 1 may act towards the switching-on direction to switch off/on the miniature circuit breaker of the present invention.

Figure 2:
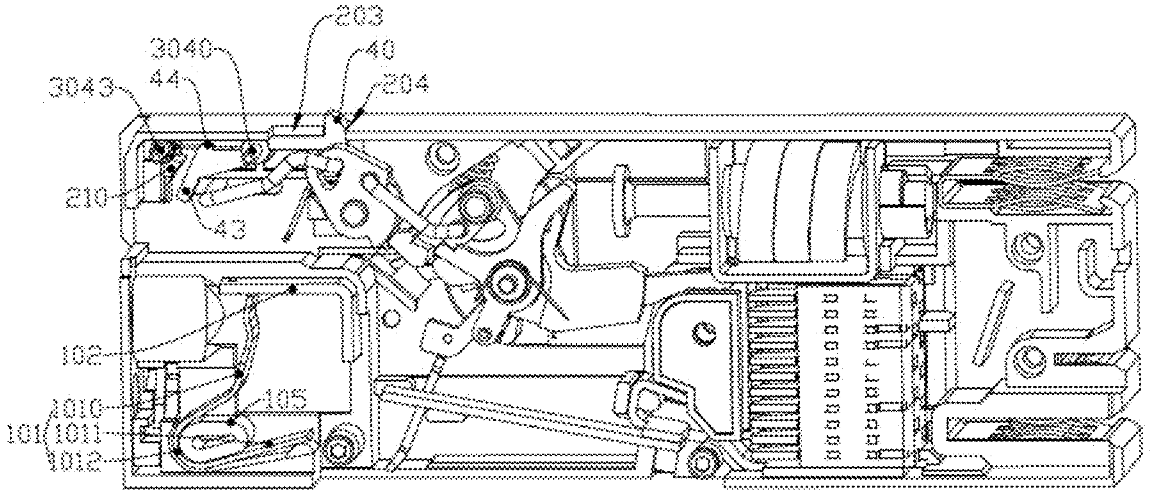
FIG. 2 is a schematic structural diagram of the miniature circuit breaker of the present invention, which shows an assembly relationship between a locking mechanism and a circuit breaker housing.
Figure 3:
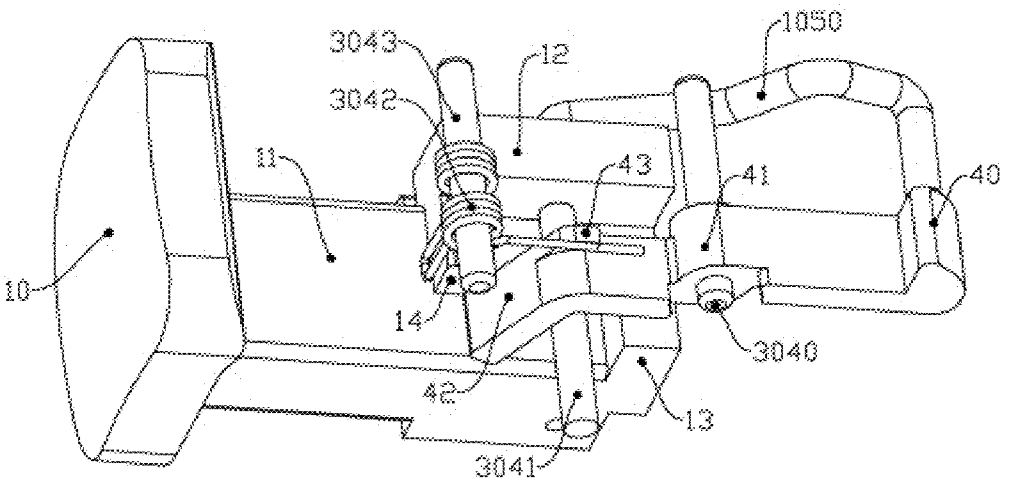
FIG. 3 is a schematic structural diagram of assembly of a button mechanism and the locking mechanism of the present invention.

Preferably, as shown in FIG. 2 and FIG. 3, the miniature circuit breaker of the present invention further includes a locking mechanism. The locking mechanism includes a second locking member 4. The button mechanism 1 is arranged at one end of the circuit breaker housing 2 and is in sliding fit with the circuit breaker housing. The circuit breaker housing 2 includes a second opening hole 204 arranged in one side thereof, and the second locking member 4 is pivotally arranged on the circuit breaker housing 2. One end of the second locking member 4 is in driving fit with the button mechanism 1, and the other end of the second locking member passes through the second opening hole 204 and is in limit fit with the external housing of the installed position for the circuit breaker. When pulling the button mechanism 1 toward the outside of the circuit breaker housing 2, the button mechanism 1 drives the second locking member 4 to rotate, so that the second locking member 4 releases the limit coordination with the external housing of the installed position for the circuit breaker. According to the locking mechanism, one end of the second locking member 4 is in limit fit with the external housing of the installed position for the circuit breaker, which prevents the miniature circuit breaker of the present invention from being pulled out by mistake, ensures stable and reliable work of the circuit breaker, and avoids electric shock of a user who pulls out the circuit breaker by mistake when the circuit breaker is in a switching-on state, thus being conductive to improving a safety of electricity consumption.

Preferably, as shown in FIG. 2 and FIG. 3, the locking mechanism further includes a second locking spring. The second locking member 4 includes a second locking member body 41, and a second locking member protrusion 40 and a second locking member driving arm 42 which are respectively arranged at two ends of the second locking member body 41. The second locking member body 41 is pivotally arranged on the circuit breaker housing 2, and is connected with the second locking member driving arm 42 in a bent manner. The circuit breaker housing 2 includes a second opening hole 204 arranged in one side thereof. The second locking spring is respectively connected with the second locking member body 41 and the circuit breaker housing 2, so that the second locking member protrusion 40 passes through the second opening hole 204 and protrudes outside the circuit breaker housing 2. After the miniature circuit breaker is installed in place to the installed position for the circuit breaker, the second locking member protrusion 40 passes through the second opening hole 204 and is in limit fit with the external housing of the installed position for the circuit breaker. According to the locking mechanism, after the miniature circuit breaker of the present invention is installed in place to the installed position for the circuit breaker, the second locking member protrusion 40 is in limit fit with the external housing of the installed position for the circuit breaker, which prevents the miniature circuit breaker of the present invention from being pulled out by mistake, ensures stable and reliable work of the circuit breaker, and avoids electric shock of a user who pulls out the circuit breaker by mistake when the circuit breaker is in a switching-on state, thus being conductive to improving a safety of electricity consumption.

Preferably, the installation cabinet for installing the circuit breaker may be arranged at the assembly position of the circuit breaker.

Preferably, as shown in FIG. 3 and FIG. 5, the button mechanism 1 includes a button head 10, a button body 11, and a first connecting rod 1050. The button head 10 is arranged at one end of the button body 11 and protrudes outside the circuit breaker housing 2, so that the user may conveniently operate the button mechanism 1. One end of the first connecting rod 1050 is inserted into the other end of the button body 11, one end of the first locking member 3 is in locking fit with one end of the first connecting rod 1050 inserted into the button body 11, and the second locking member 4 is in driving fit with one end of the first connecting rod 1050 inserted into the button body 11. The first connecting rod 1050 not only serves as a transmission element between the button mechanism 1 and the operating mechanism 5, but also is matched with the first locking member 3 and the second locking member 4 respectively, which is conductive to simplifying a structure of the button mechanism 1, and saves a production cost of the miniature circuit breaker of the present invention.

Preferably, the first locking member body 31 of the first locking member 3 and the second locking member body 41 of the second locking member 4 are both pivotally arranged on the circuit breaker housing 2 through a first pivot 3040, which is conductive to simplifying an assembly structure of the anti-switching-on mechanism and the locking mechanism, thus saving an assembly space inside the circuit breaker housing 2, and being conductive to miniaturizing the miniature circuit breaker of the present invention.

Preferably, the first locking spring and the second locking spring are double torsion springs 3042 with an integrated structure, which include double torsion spring first ends, double torsion spring second ends, and double torsion spring third ends. The double torsion spring first ends are connected with the first locking member body 31, the double torsion spring second ends are connected with the second locking member body 41, and the double torsion spring third ends are connected with the circuit breaker housing 2. The double torsion springs 3042 may be connected with the first locking member 3, the second locking member 4, and the circuit breaker housing 2 at the same time, which is conductive to further simplifying an assembly structure of the anti-switching-on mechanism and the locking mechanism, simplifying an assembly operation, and improving an assembly efficiency.

Figure 8:
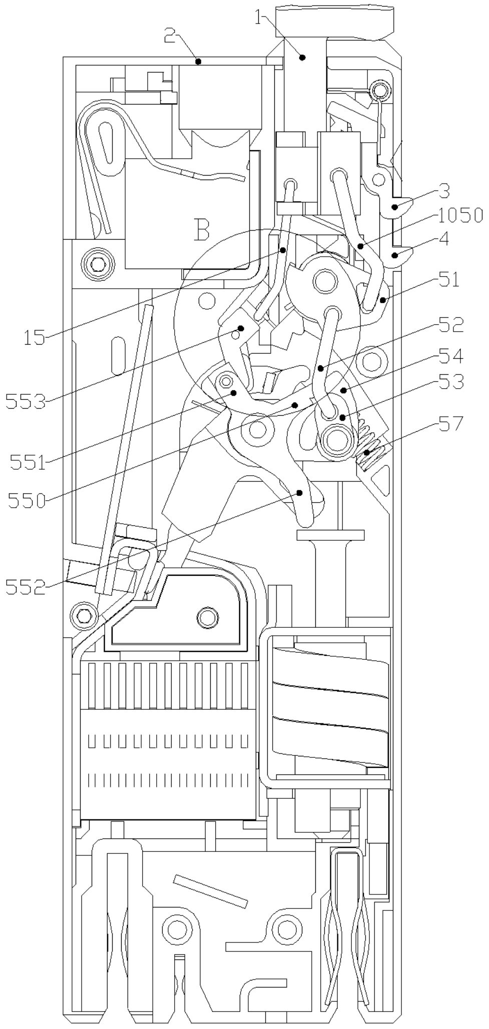
FIG. 8 is a schematic structural diagram of the operating mechanism of the present invention.

Preferably, as shown in FIG. 1 and FIG. 8, the operating mechanism 5 includes a catch member 53, a supporting member 54, and a buckle member 55. The supporting member 54 is pivotally arranged on the circuit breaker housing 2, and the catch member 53 and the buckle member 55 are pivotally arranged on the supporting member 54 respectively. The button mechanism 1 is drivingly connected with the operating mechanism 5, the catch member 53 is in catch fit with the buckle member 55, and the buckle member 55 is in driving fit with the supporting member 54. The supporting member 54 is connected with the moving contact 56, and the supporting member 54 is connected with the moving contact.

The miniature circuit breaker of the present invention further includes a switching-off rod 15. The switching-off rod 15 includes a switching-off rod connecting end and a switching-off rod driving end. The switching-off rod connecting end is connected with the button mechanism 1, and the switching-off rod driving end is in driving fit with the buckle member 55. When the miniature circuit breaker is in a switching-off state, the catch member 53 is in catch fit with the buckle member 55, and the button mechanism 1 is pressed to drive the operating mechanism 5 to act. The operating mechanism 5 drives the moving contact 56 to be connected with the static contact 560, the miniature circuit breaker enters the switching-on state, and meanwhile, the switching-off rod 15 slides to a position matched with the buckle member 55. The button mechanism 1 is pressed again, a switching-off rod driving end drives the buckle member 55 to rotate, so that the buckle member 55 is unlocked from the catch member 53. The operating mechanism 5 is released, the supporting member 54 drives the moving contact 56 to be disconnected from the static contact 560, the miniature circuit breaker enters a switching-off state, and meanwhile, the switching-off rod 15 is reset to an initial position.

It should be pointed out that the catch fit between the catch member 53 and the buckle member 55 refers to that one end of the catch member 53 is in lap joint with the buckle member 55, and limits an action of the buckle member 55. Once a lap joint relationship between the catch member 53 and the buckle member 55 is broken, the action of the buckle member 55 is no longer limited by the catch member 53.

According to an existing miniature circuit breaker, a button is pulled to switch off the circuit breaker, but the circuit breaker is often pulled out of the cabinet due to an excessively large force applied by the user by the pulling manner, so that an assembly stability of the circuit breaker is poor, and user experience is affected.

According to the miniature circuit breaker of the present invention, the circuit breaker may be switched off/on by pressing the button mechanism 1. Compared with the prior art that the circuit breaker is switched off by pulling the button mechanism, the present invention is capable of avoiding a situation that the circuit breaker is pulled out of the cabinet due to an excessively large force applied by the user to pull the button mechanism, which is conducive to improving an assembly stability of the circuit breaker, and improving user experience.

It should be pointed out that according to the miniature circuit breaker of the present invention, when the miniature circuit breaker is in the switching-on state, the switching-off operation may also be implemented by pulling the button mechanism 1, and the switching-off rod 15 may be pulled without affecting pulling of the button mechanism 1. Further, the miniature circuit breaker of the present invention may not be provided with the switching-off rod 15, and the first connecting rod 1050 drives the operating mechanism 5 to rotate past a dead point for switching off by pulling the button mechanism 1, thus disconnecting the moving contact 56 from the static contact 560.

Preferably, the miniature circuit breaker of the present invention further includes an indicating apparatus. The circuit breaker housing 2 includes an indicating hole arranged in one side thereof, the button mechanism 1 is in sliding fit with the circuit breaker housing 2, and the indicating apparatus is in driving fit with the button mechanism 1. When the button mechanism 1 is pressed to switch on the miniature circuit breaker, the button mechanism 1 drives the indicating apparatus to shield the indicating hole. According to the miniature circuit breaker of the present invention, when the circuit breaker is switched on, the indicating apparatus may shield the indicating hole to indicate that the circuit breaker is in the switching-on state, and plays a warning role to a user, prompting the user not to disconnect and connect wire for the miniature circuit breaker, thus significantly improving the safety of electricity consumption.

Figure 12:
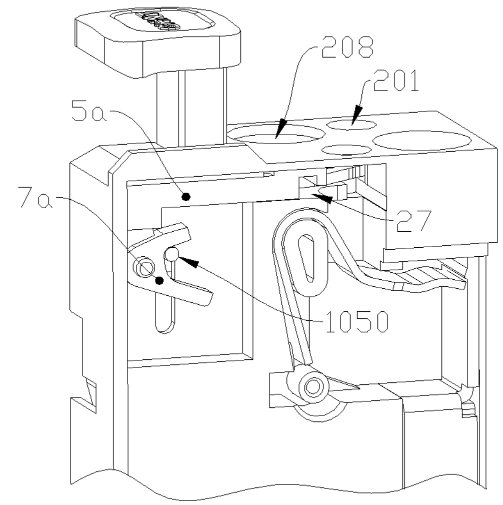
FIG. 12 is a schematic structural diagram of assembly of a first baffle, a linkage, the button mechanism, and the circuit breaker housing of the present invention.
Figure 14:
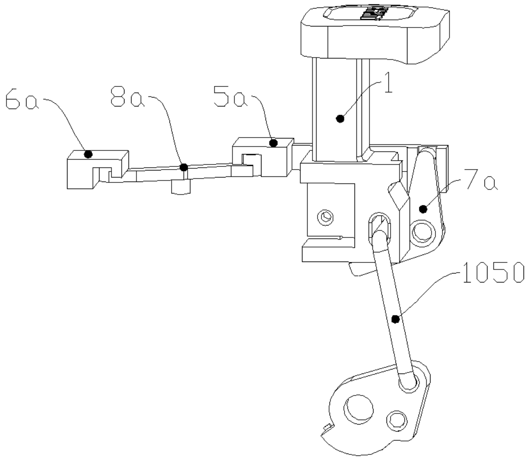
FIG. 14 is a schematic structural diagram of an indicating apparatus of the present invention.

Preferably, as shown in FIG. 12 and FIG. 14, the circuit breaker housing 2 includes at least one wire insertion hole 208 and at least one wire removal hole 201 arranged on one side thereof the wire insertion hole 208 is matched with the wire removal hole 201 for use, and the button mechanism 1, the wire removal hole 201, and the wire insertion hole 208 are located at a same end of the circuit breaker housing 2. The miniature circuit breaker of the present invention further includes the indicating apparatus, and the indicating apparatus includes at least one baffle and a linkage 7*a*. A middle portion of the linkage 7*a* is pivotally arranged on the circuit breaker housing 2, one end of the linkage 7*a* is drivingly connected with the button mechanism 1, and the other end of the linkage is in driving fit with the baffle. The button mechanism 1 is pressed to switch on the miniature circuit breaker, the button mechanism 1 drives the baffle to move to the wire removal hole 201 through the linkage 7*a* and shield the wire removal hole 201. Further, the baffle is in sliding fit with the circuit breaker housing 2.

Preferably, the middle portion of the linkage 7*a* is pivotally arranged on the circuit breaker housing 2, and the linkage 7*a* includes a linkage driven arm 71*a*, and a linkage driving arm 70*a*. A middle portion of the linkage driven arm 71*a* is provided with a linkage driven arm slot 73*a*, and the linkage driving arm 70*a* is provided with a linkage driving column 72*a*. One end of the baffle which is in driving fit with the linkage 7*a* is provided with a baffle driven end slot. The button mechanism 1 includes a button driving column, the button driving column is drivingly connected with the linkage driven arm slot 73*a*, and the linkage driving column 72*a* is drivingly connected with the baffle driven end slot.

Preferably, the baffle is in sliding fit with the circuit breaker housing 2.

Preferably, the wire removal hole 201 is the indicating hole.

According to an existing miniature circuit breaker, when the circuit breaker is switched on and powered on, the wire removal hole is exposed, and a circuit inside the circuit breaker housing may still be contacted through the wire removal hole, so that the user is very likely to get electric shock due to a misoperation on the wire removal hole, thus having a great potential safety hazard.

According to the miniature circuit breaker of the present invention, when the circuit breaker is switched on, the baffle may move to the wire removal hole and shield the wire removal hole, which firstly plays a warning role to the user, prompting the user not to operate the wire removal hole, and secondly shields the wire removal hole, avoiding the user from operating the wire removal hole, thus significantly improving a safety of electricity consumption.

Figure 18:
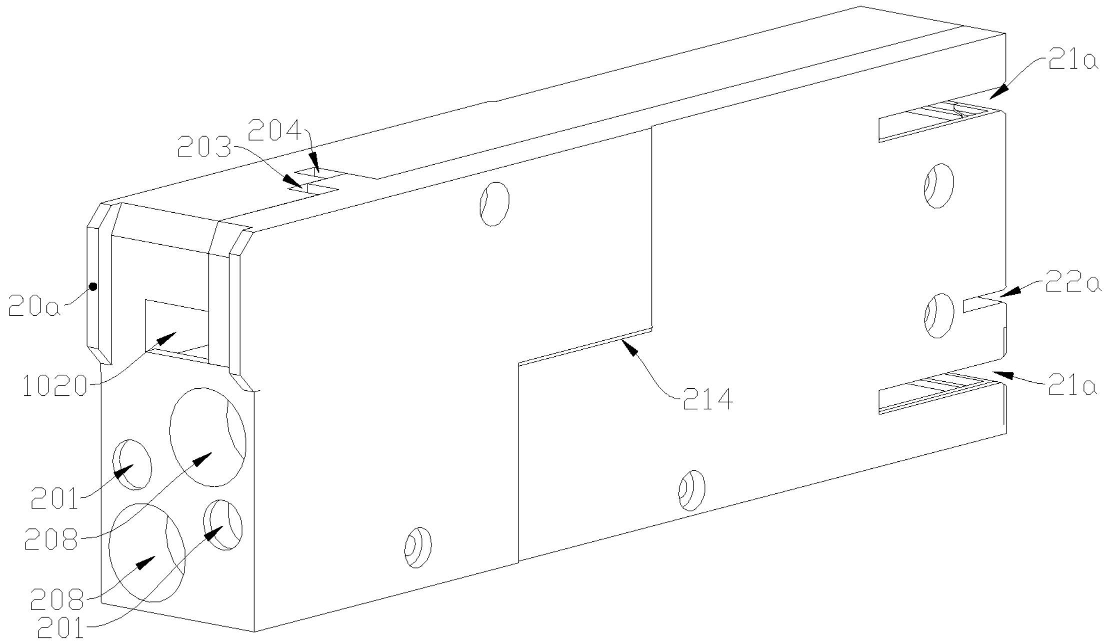
FIG. 18 is a schematic structural diagram of the circuit breaker housing of the present invention, which shows various opening holes of the circuit breaker housing.
Figure 19:
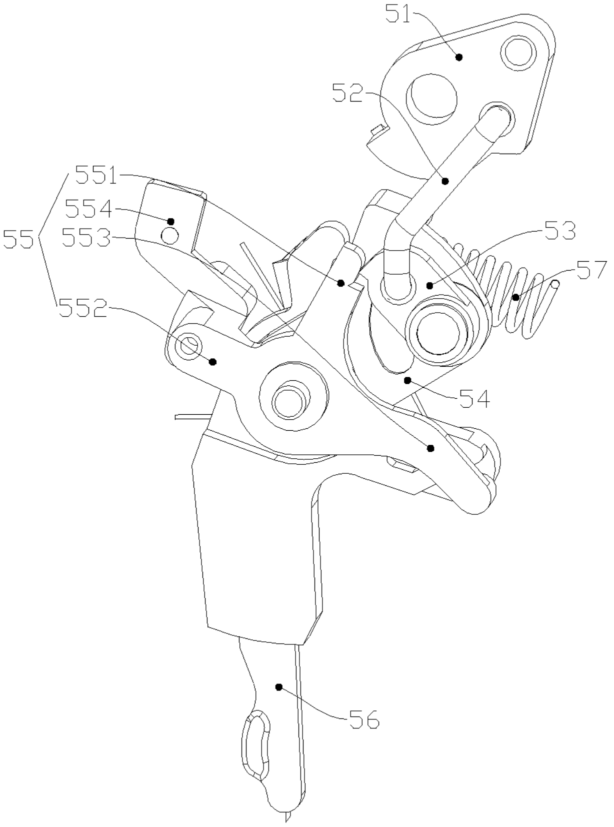
FIG. 19 is a schematic structural diagram of the operating mechanism of the present invention.
Figure 20:
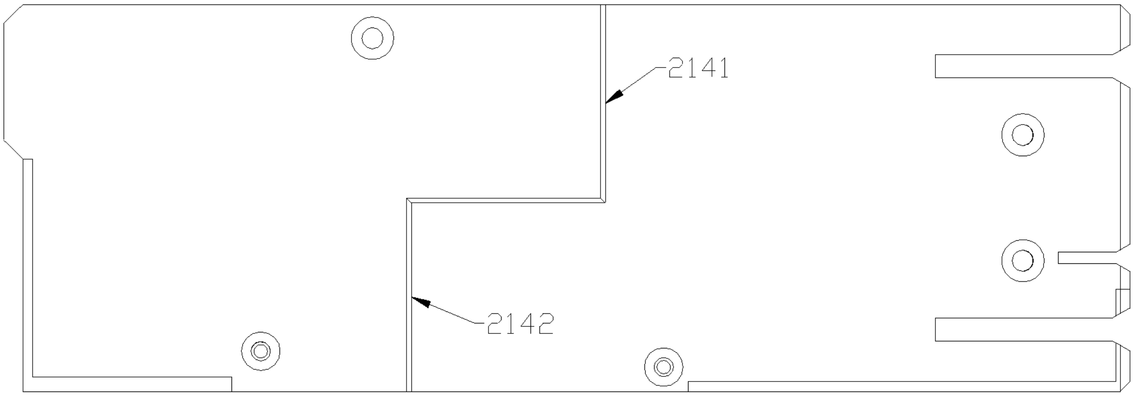
FIG. 20 is a schematic structural diagram of the circuit breaker housing of the present invention, which shows a structure of an installation guide positioning step.
Figure 21:
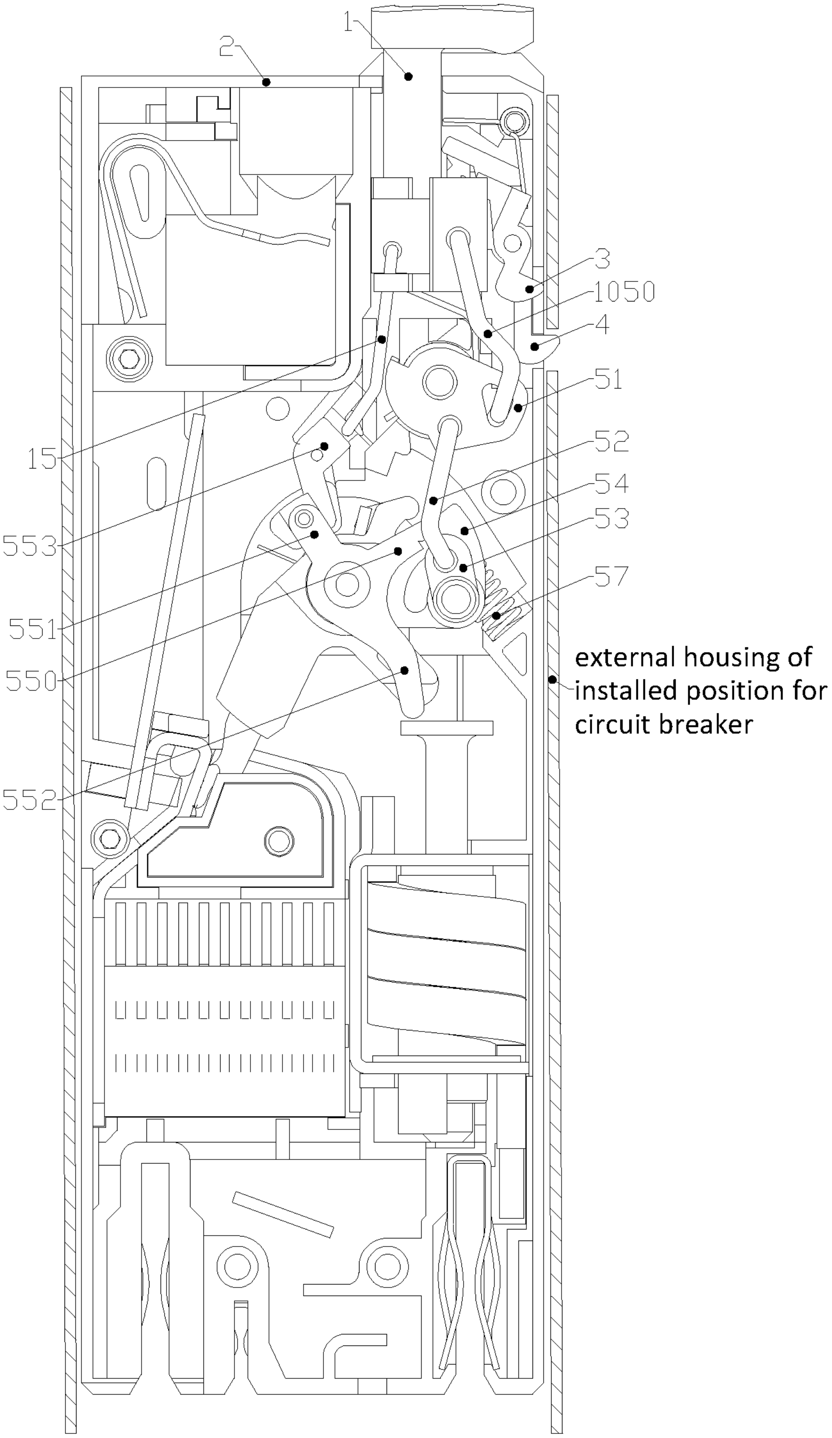
FIG. 21 is a schematic structural diagram of the miniature circuit breaker of the present invention, a first locking member protrusion is pressed, by an external housing of installed position, to move into the circuit breaker housing.

Preferably, as shown in FIG. 18 and FIG. 20, the circuit breaker housing 2 has a cuboid structure, and the circuit breaker housing 2 includes a front end face and a rear end face which are oppositely arranged, a left side face and a right side face which are oppositely arranged, and an upper surface and a lower surface which are oppositely arranged. An inlet hole 21*a* is arranged in the rear end face, an operating member installation hole 1020 and a wire insertion hole 208 are arranged in the front end face, and a plug-in wiring terminal is arranged in the inlet hole 21*a*. According to the miniature circuit breaker of the present invention, the wire insertion hole and the inlet hole are arranged in the front end face and the rear end face of the circuit breaker housing 2 respectively, and an external wire may be directly plugged with or pulled from the plug-in wiring terminal in the inlet hole, so that when the circuit breaker is installed and replaced, an excessively large disassembly and assembly space is not needed, and disassembly and assembly are convenient.

FIG. 1 shows an optimal embodiment of the miniature circuit breaker of the present invention.

In a direction shown in FIG. 1, the miniature circuit breaker of the present invention includes a circuit breaker housing 2, a button mechanism 1, an anti-switching-on mechanism, a locking mechanism, an operating mechanism 5, a short circuit protection mechanism 6, an arc extinguishing mechanism 7, an inlet end 8, an overload protection mechanism 9, a moving contact 56, a static contact 560, and an outlet end 100. The button mechanism 1 is inserted into an upper end of the circuit breaker housing 2 and is in sliding fit with the circuit breaker housing 2, the outlet end 100 is arranged at an upper end of the circuit breaker housing 2 and is located on a left side of the button mechanism 1, and the short circuit protection mechanism 6, the arc extinguishing mechanism 7, and the inlet end 8 are arranged at a lower end of the circuit breaker housing 2. The short circuit protection mechanism 6 and the arc extinguishing mechanism 7 are arranged on an upper side of the inlet end 8, and the arc extinguishing mechanism 7 and the short-circuit protection mechanism 6 are arranged side by side. The operating mechanism 5 and the overload protection mechanism 9 are arranged in a middle portion of the circuit breaker housing 2, the operating mechanism 5 is located between the short circuit protection mechanism 6 and the button mechanism 1, and the overload protection mechanism 9 is located between the arc extinguishing mechanism 7 and the outlet end 100. The button mechanism 1 is drivingly connected with the operating mechanism 5 through a first connecting rod 1050, the operating mechanism 5 is connected with the moving contact 56, the overload protection mechanism 9 is connected with the static contact 560, the arc extinguishing mechanism 7 is matched with the moving contact 56 and the static contact 560 for use, and the short circuit protection mechanism 6 and the overload protection mechanism 9 are in driving fit with the operating mechanism 5 respectively.

Preferably, as shown in FIG. 1, the overload protection mechanism 9 includes a bimetallic strip and an adjusting screw. An upper end of the bimetallic strip is in driving fit with the buckle member 55 of the operating mechanism 5, and a lower end of the bimetallic strip is fixedly arranged on the circuit breaker housing 2. The adjusting screw is arranged on a left side of the lower end of the bimetallic strip, and a position of the bimetallic strip of the overload protection mechanism may be adjusted by screwing the adjusting screw, thus adjusting an overload current protection range of the miniature circuit breaker of the present invention.

As shown in FIG. 4 and FIG. 5, the anti-switching-on mechanism includes a first locking member 3. The first locking member 3 includes a first locking member body 31, and a first locking member protrusion 30 and a first locking member stop arm 32 which are respectively arranged at two ends of the first locking member body 31. In a direction shown in FIG. 4, the first locking member 3 is pivotally arranged at an upper right corner of the circuit breaker housing 2 through a first pivot 3040 and is located on a right side of the button mechanism 1. Double torsion springs 3042 are arranged above the first locking member 3, and double torsion spring first ends and double torsion spring third ends of the double torsion springs 3042 are respectively connected with the first locking member body 31 of the first locking member 3 and the circuit breaker housing 2, so that the first locking member protrusion 30 passes through a first opening hole 203 of the circuit breaker housing 2 and protrudes outside the circuit breaker housing 2. As shown in FIG. 5, the button mechanism 1 includes a button head 10, a button body 11, and a first connecting rod 1050. The button head 10 is arranged at one end of the button body 11 and protrudes outside the circuit breaker housing 2, so that the user may conveniently operate the button mechanism 1. One end of the first connecting rod 1050 is inserted into the other end of the button body 11 and forms a first transmission rod 3041, and the first locking member stop arm 32 is in locking fit with the first transmission rod 3041. Specifically, in a direction shown in FIG. 5, the button head 10 is connected with a left end of the button body 11, the first transmission rod 3041 is arranged at a right end of the button body 11, and the first locking member stop arm 32 is arranged on a right side of the first transmission rod 3041. When the button mechanism 1 is pressed, the first locking member stop arm 32 prevents the button mechanism 1 from moving to the right, which means that the button mechanism 1 is prevented from moving towards a switching-on direction. After the miniature circuit breaker of the present invention is assembled to an assembly position of the circuit breaker and installed in place, the external housing of the installed position for the circuit breaker squeezes the first locking member protrusion 30, so that the first locking member protrusion 30 moves into the circuit breaker housing 2, and then the first locking member stop arm 32 tilts up and no longer blocks the first transmission rod 3041. At the moment, the circuit breaker may be switched on by pressing the button mechanism 1.

Preferably, as shown in FIG. 5, the first locking member 3 includes a first locking spring limit protrusion 33 arranged on one side of the first locking member body 31, and the first locking spring limit protrusion 33 is in limit fit with the double torsion spring first ends of the double torsion springs 3042. Specifically, in a direction shown in FIG. 5, the first locking spring limit protrusion 33 is arranged on a rear side of the left end of the first locking member body 31, and the double torsion spring first ends are located on a front side of the first locking spring limit protrusion 33 and are in limit fit with the first locking spring limit protrusion.

Preferably, as shown in FIG. 5, the button mechanism 1 includes a transmission rod installation table 12. The first connecting rod 1050 is a U-shaped rod, and one end of the first connecting rod 1050 is inserted into the transmission rod installation table 12 and forms a first transmission rod 3041 protruding from one side of the installation table 12. The first locking member stop arm 32 of the first locking member 3 is located on one side of the transmission rod installation table 12 and is in locking fit with the first transmission rod 3041, and the first locking member stop arm 32 blocks the first transmission rod 3041 from moving in a switching-on direction. Specifically, in a direction shown in FIG. 5, the transmission rod installation table 12 is arranged on an upper side of the right end of the button body 11, and the left end of the first connecting rod 1050 is inserted into the transmission rod installation table 12 and forms the first transmission rod 3041 protruding from a front side of the transmission rod installation table 12. The first locking member stop arm 32 is located on a right side of the first transmission rod 3041 and is in locking fit with the first transmission rod. Further, in a direction shown in FIG. 5, the button mechanism 1 further includes a first limit boss 13, and the first limit boss 13 is spaced with the transmission rod installation table 12 and is located on a front side thereof. The first limit boss 13 is in contact fit with the circuit breaker housing 2, so that the button mechanism 1 is kept stable when sliding in the circuit breaker housing 2, thus avoiding shaking Preferably, in a direction shown in FIG. 5, the button mechanism 1 further includes a button protrusion 14. The button protrusion 14 is arranged on an upper side of the button body 11 and is located on a front side of the transmission rod installation table 12, and a rear end of the button protrusion 14 is connected with a front end of the transmission rod installation table 12.

As shown in FIG. 2 and FIG. 3, the locking mechanism includes a second locking member 4. The second locking member 4 includes a second locking member body 41, and a second locking member protrusion 40 and a second locking member driving arm 42 which are respectively arranged at two ends of the second locking member body 41. In a direction shown in FIG. 2, the locking mechanism is arranged at an upper right corner of the circuit breaker housing 2 and is located on a right side of the button mechanism 1. The second locking member body 41 of the second locking member 4 is pivotally installed on the circuit breaker housing 2 through the first pivot 3040. As shown in FIG. 3, the second locking member driving arm 42 of the second locking member 4 is in driving fit with the first transmission rod 3041 of the first connecting rod 1050. Specifically, in a direction shown in FIG. 3, the second locking member driving arm 42 is arranged on a left side of the first transmission rod 3041. After the miniature circuit breaker of the present invention is installed in place to the installed position for the circuit breaker, the external housing of the installed position for the circuit breaker is in limit fit with the second locking member body 41, so that the circuit breaker is reliably limited and installed in the installed position for the circuit breaker. When the button mechanism 1 is pulled out of the circuit breaker housing 2, the button mechanism 1 is pulled to the left. The first transmission rod 3041 drives the second locking member driving arm 42, so that the second locking member driving arm 42 tilts up, and the second locking member protrusion 40 goes down and moves into the circuit breaker housing 2, so that the second locking member protrusion 20 is released from the installed position for the circuit breaker, and the user may disassemble the circuit breaker from the installed position for the circuit breaker.

Preferably, as shown in FIG. 3, the second locking member 4 includes a second locking spring limit protrusion 43 arranged on one side of the second locking member body 41, and the double torsion spring second ends of the double torsion springs 3042 are in limit fit with the second locking spring limit protrusion 43. Specifically, in a direction shown in FIG. 3, the second locking spring limit protrusion 43 is arranged on a rear side of the left end of the second locking member body 41, and the double torsion spring second ends are arranged on a front side of the second locking spring limit protrusion 43 and are in limit fit with the second locking spring limit protrusion.

Preferably, in a direction shown in FIG. 5, the double torsion springs 3042 are installed on the circuit breaker housing 2 through a third installation shaft 3043, and the double torsion springs 3042 include double torsion spring first ends, double torsion spring second ends, and double torsion spring third ends. The double torsion spring first ends and the double torsion spring second ends are arranged above the button body 11 and are substantially parallel to the button body 11, and the double torsion spring third ends are arranged above the button body 11 and are substantially perpendicular to the button body. The double torsion spring third ends are also matched with the button protrusion 14 of the button mechanism 1, and the double torsion spring third ends block the button protrusion 14 in a switching-off direction of the button mechanism 1, thus limiting a position of the button mechanism 1 in the switching-off direction. Specifically, in a direction shown in FIG. 2, the first installation shaft 3043 is installed at an upper right corner of the circuit breaker housing 2.

Preferably, as shown in FIG. 2, the circuit breaker housing 2 further includes a third locking spring limit protrusion 210, and the third locking spring limit protrusion 210 is connected with the double torsion spring third ends. Specifically, in a direction shown in FIG. 2, the third locking spring limit protrusion 210 is arranged above the locking mechanism and the anti-switching-on mechanism, and is located on a left side of the first installation shaft 3043.

Preferably, as shown in FIG. 1, the button mechanism 1 is arranged at one end of the circuit breaker housing 2 and is in sliding fit with the circuit breaker housing. The third locking spring limit protrusion 210, the first installation shaft 3043, the first locking member 3, the second locking member 4, and the double torsion springs 3042 are all arranged on one side of the button mechanism 1. The first installation shaft 3043 is arranged at an inner corner of the circuit breaker housing 2, the third locking spring limit protrusion 210 is located between the first installation shaft 3043 and the button mechanism 1, and the first locking member 3 and the second locking member 4 are arranged side by side and are located on one side of the third locking spring limit protrusion 210. A first opening hole 203 is closer to the first installation shaft 3043 than a second opening hole 204, and the first pivot 3040 is located between the first opening hole 203 and the first installation shaft 3043. Specifically, in a direction shown in FIG. 1, the button mechanism 1 is arranged at an upper end of the circuit breaker housing 2 and is in sliding fit with the circuit breaker housing. The anti-switching-on mechanism, the locking mechanism, and the double torsion springs are all arranged on a right side of the button mechanism 1. The first installation shaft 3043 is arranged at an upper right corner of the circuit breaker housing 2, and the double torsion springs 3042 are sleeved on the first installation shaft 3043. The anti-switching-on mechanism and the locking mechanism are both pivotally arranged on the circuit breaker housing 2 through the first pivot 3040, and are located below the first installation shaft 3043. The first locking member 3 of the anti-switching-on mechanism and the second locking member 4 of the locking mechanism are arranged side by side, the second locking member 4 is located on an inner side, and the first locking member 3 is located on an outer side. The first opening hole 203 is located above the second opening hole 204, and the third locking spring limit protrusion 210 is arranged on a left side of the first installation shaft 3043.

Figure 6:
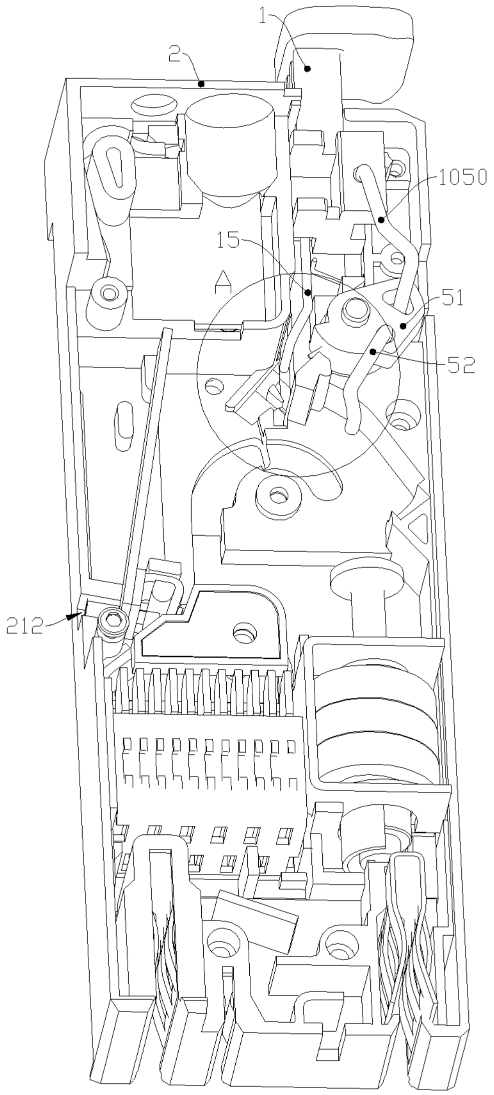
FIG. 6 is a schematic structural diagram of assembly of the button mechanism and an operating mechanism of the present invention.

As shown in FIG. 1, FIG. 6, and FIG. 8, the operating mechanism 5 includes a transmission member 51, a second connecting rod 52, a catch member 53, a supporting member 54, a buckle member and a first reset spring 57. The transmission member 51 is pivotally arranged on the circuit breaker housing 2 through a second pivot 510, the supporting member 54 is pivotally arranged on the circuit breaker housing 2 through a third pivot 540, the catch member 53 is pivotally arranged on the supporting member 54 through a fourth pivot 530, and the buckle member 55 is pivotally arranged on the supporting member 54 through the third pivot 540. The button mechanism 1 is drivingly connected with the transmission member 51 through the first connecting rod 1050, the transmission member 51 is drivingly connected with the catch member 53 through the second connecting rod 52, the catch member 53 is in catch fit with the buckle member 55, and the buckle member 55 is in driving fit with the supporting member 54. The supporting member 54 is connected with the moving contact 56.

It should be pointed out that, in addition to locking and preventing the circuit breaker from being switched on when the circuit breaker is not installed in place by the locking fit between the first locking member 3 and the button mechanism 1, the anti-switching-on mechanism may also be in locking fit with the operating mechanism 5 (not shown in the drawings) to prevent the operating mechanism 5 from being operated to switch on. Specifically, when the circuit breaker is not installed in place, one end of the first locking member 3 of the anti-switching-on mechanism may resist locking with the supporting member 54 of the operating mechanism 5. After the circuit breaker is installed in place, the external housing of the installed position for the circuit breaker triggers the first locking member 3 to rotate, so that the first locking member 3 contacts and is in locking fit with the supporting member 54 of the operating mechanism 5. Therefore, the button mechanism 1 is capable of moving in the switching-on direction, and drives the operating mechanism 5 to act so as to perform a switching-on operation.

Figure 7:
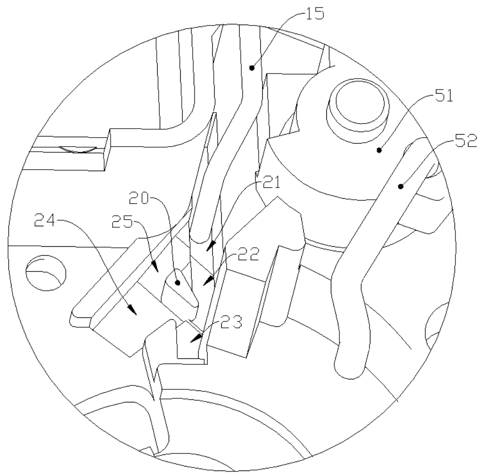
FIG. 7 is a schematic structural diagram of a part A in FIG. 6 of the present invention, which shows a positional relationship among a switching-off rod, a guide boss, and a guide groove set when the circuit breaker is in a switching-off state.
Figure 9:
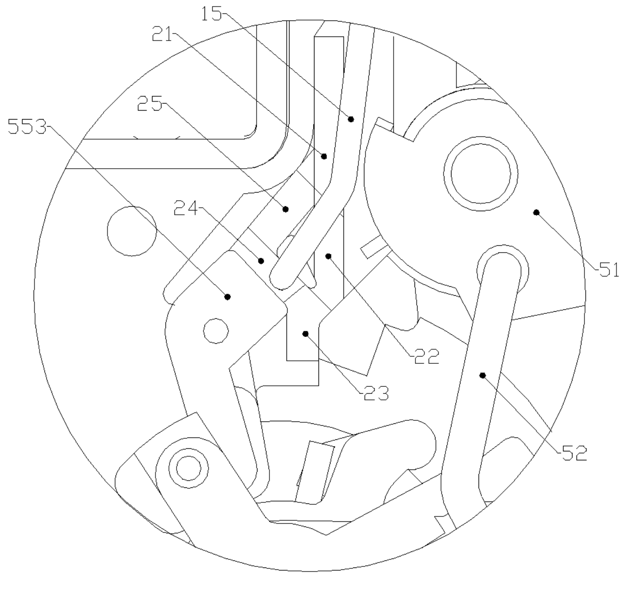
FIG. 9 is a schematic structural diagram of a part B in FIG. 8 of the present invention, which shows a positional relationship among a switching-off rod, a guide boss, and a guide groove set when the circuit breaker is in a switching-on state.

The operating mechanism 5 further includes a switching-off rod 15, a button mechanism reset member 10*a*, a guide boss 20, and a guide groove set. The switching-off rod 15 includes a switching-off rod connecting end and a switching-off rod driving end. The switching-off rod connecting end is connected with the button mechanism 1, and the switching-off rod driving end is in driving fit with the buckle member 55. The guide boss 20 is arranged on the circuit breaker housing 2. As shown in FIG. 7 and FIG. 9, the guide groove set includes a first guide groove 21, a second guide groove 22, a third guide groove 23, a fourth guide groove 24, and a fifth guide groove 25. The first guide groove 21, the second guide groove 22, the third guide groove 23, the fourth guide groove 24, and the fifth guide groove 25 are connected end to end to form the annular guide groove set surrounding the guide boss 20. When the miniature circuit breaker is in the switching-off state, the button mechanism 1 is pressed, the switching-off rod driving end of the switching-off rod 15 passes through the first guide groove 21 and then the second guide groove 22 to enter the third guide groove 23, and the miniature circuit breaker enters the switching-on state. The button mechanism 1 is released, under a counterforce of the button mechanism reset member 10*a*, the button mechanism 1 drives the switching-off rod driving end to pass through the third guiding groove 23 to enter the fourth guiding groove 24. At the moment, a front end of the switching-off rod driving end is aligned with the buckle member 55, and the guide boss 20 blocks the switching-off rod 15 in a reset direction of the switching-off rod 15 to prevent the switching-off rod 15 and the button mechanism 1 from resetting under the counterforce of the button mechanism reset member 10*a*. The button mechanism 1 is pressed again, the switching-off rod driving end drives the buckle member 55 to rotate, the buckle member 55 is unlocked from the catch member 53, the operating mechanism 5 is buckled, the operating mechanism 5 drives the button mechanism 1 to reset, and the button mechanism 1 drives the switching-off driving end to pass through the fourth guide groove 24 and then the fifth guide groove 25 to enter the first guide groove 21. The button mechanism 1 and the operating mechanism 5 are both restored to an initial state, so that the miniature circuit breaker enters the switching-off state.

Figure 10:
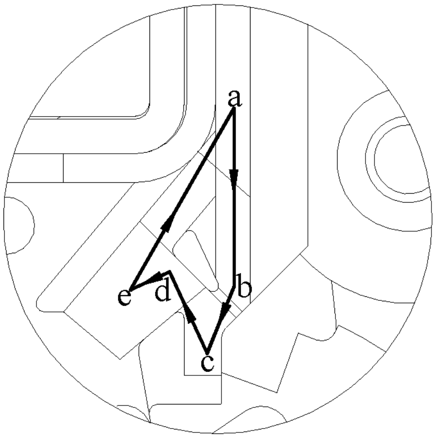
FIG. 10 is a schematic diagram of a trajectory of the switching-off rod in the guide groove set of the present invention.

FIG. 10 shows of a trajectory of the switching-off rod driving end of the switching-off rod 15: when the miniature circuit breaker of the present invention is changed from the switching-off state to the switching-on state, a broken line a-b-c-d basically describes the trajectory of the switching-off rod driving end; and when the miniature circuit breaker of the present invention is changed from the switching-on state to the switching-off state, a broken line d-e-a basically describes the trajectory of the switching-off rod driving end.

Preferably, as shown in FIG. 7, the first guide groove 21 includes a first guide groove bottom surface, the second guide groove 22 includes a second guide groove bottom surface, the third guide groove 23 includes a third guide groove bottom surface, the fourth guide groove 24 includes a fourth guide groove bottom surface, and the fifth guide groove 25 includes a fifth guide groove bottom surface. The second guide groove bottom surface is an inclined plane, one end of the second guide groove bottom surface connected with the first guide groove bottom surface is flush with the first guide groove bottom surface, one end of the second guide groove bottom surface connected with the third guide groove 23 is higher than the first guide groove bottom surface, and is higher than the third guide groove bottom surface, the fourth guide groove bottom surface is lower than the third guide groove bottom surface, the fifth guide groove bottom surface is an inclined plane, one end of the fifth guide groove bottom surface connected with the fourth guide groove bottom surface is flush with the fourth guide groove bottom surface, and one end of the fifth guide groove bottom surface connected with the first guide groove is higher than the fourth guide groove bottom surface, and is higher than the first guide groove bottom surface.

Preferably, a step structure is arranged at a joint between the second guide groove bottom surface and the third guide groove bottom surface, a step structure is arranged at a joint between the third guide groove bottom surface and the fourth guide groove bottom surface, and a step structure is arranged at a joint between the fifth guide groove bottom surface and the first guide groove bottom surface.

Preferably, the guide boss 20 is a boss with a triangular cross section. Further, a cross section of the guide boss 20 is a right triangle or an obtuse triangle, the right angle or the obtuse angle thereof is located at a joint between the fourth guide groove 24 and the fifth guide groove 25, one acute angle thereof is located at a joint between the second guide groove 22 and the third guide groove 23, the other acute angle thereof corresponds to a joint between the first guide groove 21 and the second guide groove 22, one right angle side or one obtuse angle side thereof is arranged on one side of the fourth guide groove 24 and is parallel to the fourth guide groove, the other right angle side or the other obtuse angle side thereof is arranged on one side of the fifth guide groove 25 and is parallel to the fifth guide groove, a hypotenuse or a longest side thereof is arranged on one side of the second guide groove 22, the first guide groove 21 and the second guide groove 22 are located on a straight line, and the third guide groove 23 is located on a lower side of the guide boss 20.

It should be pointed out that in addition to using a specific structure that the guide boss is matched with the guide groove set in the embodiment, the switching-off rod may also use other matching structures, and only the button mechanism 1 needs to be matched. The button mechanism is pressed for the first time to move the switching-off rod to a second stable position matched with the buckle member, and the button mechanism is pressed for the second time to reset to an initial stable position and drive the buckle member. The structures all belong to the scope of protection of the present invention. For example, a guide structure may be arranged on the button mechanism, and a guide rod matched with the guide structure is arranged on the circuit breaker housing 2.

Preferably, as shown in FIG. 1, FIG. 2, FIG. 4, FIG. 6, and FIG. 8, the transmission member 51 includes a first transmission member connecting hole and a second transmission member connecting hole thereon, the first transmission member connecting hole is connected with the first connecting rod 1050, and an inner diameter of the first transmission member connecting hole is larger than an outer diameter of the first connecting rod 1050, so that when the miniature circuit breaker of the present invention is in the switching-on state, the button mechanism 1 has a certain degree of freedom of movement relative to the transmission member 51, and the second transmission member connecting hole is connected with the second connecting rod 52.

Preferably, as shown in FIG. 8, the buckle member 55 includes a buckle member first arm 550 and a buckle member second arm 551. A free end of the buckle member first arm 550 is in catch fit with the catch member 53, the buckle member second arm 551 is in driving fit with the switching-off rod driving end of the switching-off rod 15, and the buckle member second arm 551 is also in driving fit with the overload protection mechanism 9. Further, the buckle member 55 further includes a buckle member extension 553. One end of the buckle member extension 553 is connected with the buckle member second arm 551, and the other end of the buckle member extension is in driving fit with the switching-off rod driving end of the switching-off rod 15. The buckle member extension 553 is also in driving fit with the overload protection mechanism 9.

Preferably, as shown in FIG. 8, the buckle member 55 has a generally inverted T-shaped structure, which includes the buckle member first arm 550, the buckle member second arm 551, a buckle member third arm 552, and the buckle member extension 553. The buckle member third arm 552 is in driving fit with the short circuit protection mechanism 6. Specifically, in a direction shown in FIG. 8, the buckle member 55 has a generally inverted T-shaped structure, and a middle portion thereof is pivotally installed on the supporting member 54 through the third pivot 540. The buckle member second arm 551 and the buckle member third arm 552 are basically located in a straight line, and the buckle member first arm 550 is located between the buckle member second arm 551 and the buckle member third arm 552, and is approximately perpendicular to the straight line where the buckle member first arm and the buckle member second arm are located. A width of one end of the buckle member extension 553 matched with the switching-off rod driving end is greater than or equal to a width of the fourth guide groove 24 of the guide groove set, so as to ensure reliable matching between the switching-off rod driving end and the buckle member extension 553.

Preferably, as shown in FIG. 8, the button mechanism reset member 10*a* is an elastic metal member, one end of the button mechanism reset member is fixedly connected with the circuit breaker housing 2 and is located on one side of the transmission member 51, the other end of the button mechanism reset member extends towards the button mechanism 1 and is in driving fit with the button mechanism 1. When the miniature circuit breaker is in the switching-off state, the button mechanism 1 is separated from the button mechanism reset member 10*a*. When the miniature circuit breaker is in the switching-on state, the button mechanism 1 contacts with the button mechanism reset member 10*a*, and the button mechanism reset member 10*a* provides a counterforce in a reset direction for the button mechanism 1. It should be pointed out that when the miniature circuit breaker is in the switching-off state, the button mechanism 1 may also contact with the button mechanism reset member 10*a*.

Preferably, the button mechanism reset member 10*a* is specifically a torsion spring or a bent metal rod/strip, one end of the button mechanism reset member is fixed on the circuit breaker housing 2, and the other end of the button mechanism reset member is matched with the button mechanism 1. It can be understood that in other implementations, the button mechanism reset member 10*a* may also be a compression spring arranged between the circuit breaker housing 2 and the button mechanism 1, which provides a counterforce for the button mechanism 1.

Figure 11:
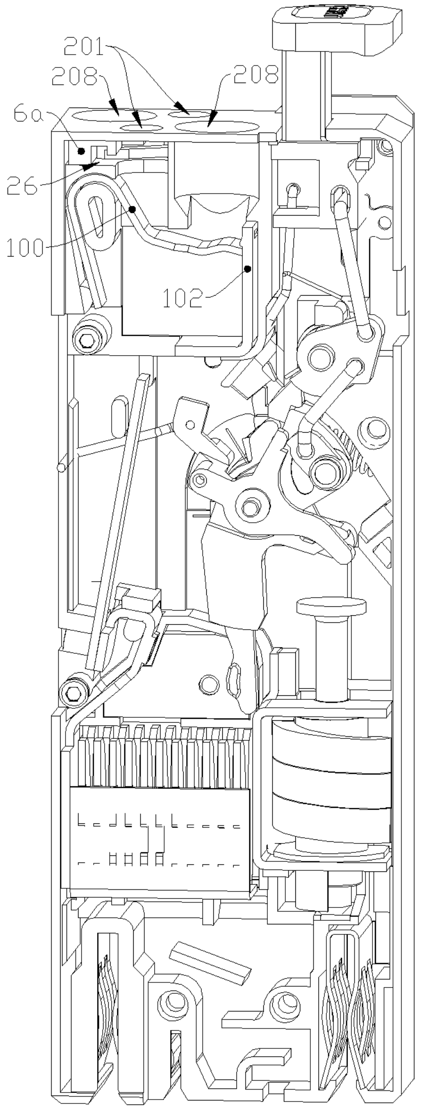
FIG. 11 is a schematic structural diagram of the miniature circuit breaker of the present invention, which shows a positional relationship among a wire insertion hole, an outlet hole, an outlet end, and a second baffle.
Figure 13:
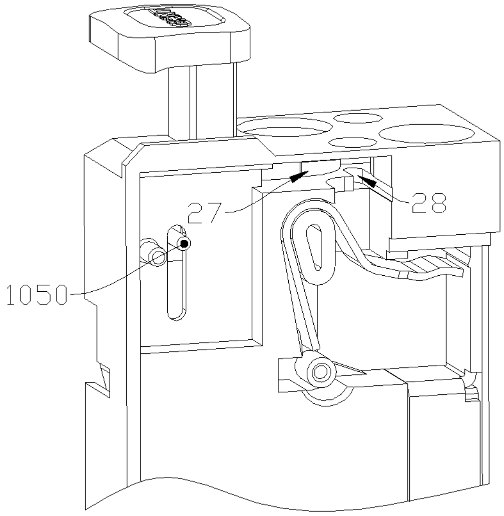
FIG. 13 is a schematic structural diagram of the circuit breaker housing of the present invention, which shows an assembly position of a second transmission rod.

As shown in FIG. 11 to FIG. 13, the circuit breaker housing 2 includes two wire insertion holes 208 and two wire removal holes 201 arranged on one side thereof. The two wire removal holes 201 are correspondingly matched with the two wire insertion holes 208 respectively. One wire removal hole 201 and one wire insertion hole 208 are a set, and each set of wire insertion hole 208 and wire removal hole 201 are both arranged corresponding to one outlet end 100. An external wire may pass through the wire insertion hole 208 to be connected with the outlet end 100, and the user may operate the outlet end 100 through the wire removal hole 201, thus pulling the external wire out of the wire insertion hole 208.

Figure 15:
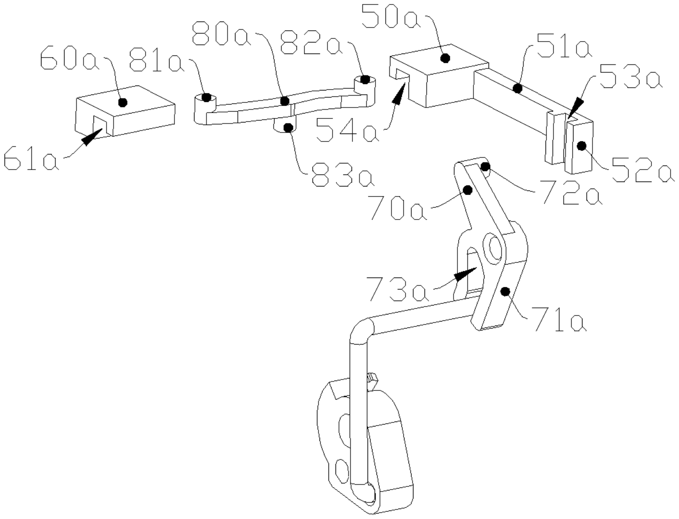
FIG. 15 is a schematic diagram of an exploded structure of the indicating apparatus of the present invention.

As shown in FIG. 13 to FIG. 15, the miniature circuit breaker of the present invention further includes an indicating apparatus. The indicating apparatus includes a first baffle 5*a*, a second baffle 6*a*, a linkage 7*a*, and a second transmission rod 8*a*. The first baffle 5*a* and the second baffle 6*a* are correspondingly matched with the two wire removal holes 201 respectively, one end of the first baffle 5*a* is drivingly connected with the linkage 7*a*, the other end of the first baffle is drivingly connected with one end of the second transmission rod 8*a*, the other end of the second transmission rod 8*a* is drivingly connected with the second baffle 6*a*, and a middle portion of the second transmission rod 8*a* is pivotally arranged on the circuit breaker housing 2. The button mechanism 1 is pressed to switch on the miniature circuit breaker, the button mechanism 1 drives the first baffle 5*a* to move to the wire removal hole 201 and shield the wire removal hole 201 through the linkage 7*a*, and the first baffle 5*a* drives the second baffle 6*a* to move to the other wire removal hole 201 and shield the wire removal hole 201 through the second transmission rod 8*a*. Specifically, as shown in FIG. 11 and FIG. 12, the wire insertion hole 208 close to the button mechanism 1 is a first wire insertion hole, and the wire insertion hole 208 far away from the button mechanism 1 is a second wire insertion hole. The wire removal hole 201 matched with the first wire insertion hole is a first wire removal hole, and the wire removal hole 201 matched with the second wire insertion hole is a second wire removal hole. The first baffle 5*a* is matched with the second wire removal hole, and the second baffle 6*a* is matched with the first wire removal hole. A middle portion of the second transmission rod 8*a* is pivotally arranged on the circuit breaker housing 2, the button mechanism 1 is pressed, the button mechanism 1 drives the linkage 7*a* to rotate, and the linkage 7*a* drives the first baffle 5*a* to move to the second wire removal hole and shield the second wire removal hole. The first baffle 5*a* drives the second transmission rod 8*a* to rotate, and the second transmission rod 8*a* drives the second baffle 6*a* to move to the first wire removal hole and shield the first wire removal hole.

Preferably, the first baffle 5*a* is arranged between the second wire removal hole and one outlet end 100, and the second baffle 6*a* is arranged between the second wire removal hole and the other outlet end 100. Further, the two outlet ends 100 are arranged corresponding to two poles of the miniature circuit breaker of the present invention respectively.

As shown in FIG. 11 to FIG. 13, the circuit breaker housing 2 further includes a first sliding cavity 27 and a second sliding cavity 26. The first sliding cavity 27 is arranged on one side of one wire insertion hole 208 and is close to the button mechanism 1, the first baffle plate 5*a* is slidably arranged in the first sliding cavity 27, the second sliding cavity 26 is arranged on one side of the other wire insertion hole 208 and is far away from the button mechanism 1, and the second baffle 6*a* is slidably arranged in the second sliding cavity 26. The first sliding cavity 27 is communicated with the second sliding cavity 26, the second transmission rod 8 is rotatably arranged at a communication place between the first sliding cavity 27 and the second sliding cavity 26, two ends of the second transmission rod 8*a* are respectively located in the first sliding cavity 27 and the second sliding cavity 6*a*, and two ends of the second transmission rod 8*a* are drivingly connected with the first baffle 5*a* and the second baffle 6*a* respectively. Specifically, as shown in FIG. 11 to FIG. 13, the first sliding cavity 27 is arranged on one side of the second wire removal hole and is close to the button mechanism 1, and the second sliding cavity 26 is arranged on one side of the first wire removal hole and is far away from the button mechanism 1. The first sliding cavity 27 is communicated with the second sliding cavity 26, the second transmission rod 8*a* is rotatably arranged at a communication place between the first sliding cavity 27 and the second sliding cavity 26, and the second transmission rod 8*a* is located between the first wire insertion hole and the second wire insertion hole. The first baffle 5*a* is slidably arranged in the first sliding cavity 27, one end of the first baffle 5*a* is drivingly connected with the linkage 7*a*, the other end of the first baffle is drivingly connected with one end of the second transmission rod 8*a*, and the other end of the second transmission rod 8*a* is drivingly connected with the second baffle 6*a*. The second baffle 6*a* is slidably arranged in the second sliding cavity 26, one outlet end 100 matched with the first wire insertion hole and the first wire removal hole is arranged below the first wire insertion hole and the first wire removal hole, and one outlet end 100 matched with the second wire insertion hole and the second wire removal hole is arranged below the second wire insertion hole and the second wire removal hole. The first baffle 5*a* is arranged between the first wire removal hole and the outlet end 100 corresponding to the first wire removal hole, and the second baffle 6*a* is arranged between the second wire removal hole and the outlet end 100 corresponding to the second wire removal hole.

As shown in FIG. 14 and FIG. 15, the first baffle 5*a* includes a first baffle driven end 52*a*, a first baffle connecting arm 51*a*, and a first baffle body 50*a*. Two ends of the first baffle connecting arm 51*a* are respectively connected with the first baffle driven end 52*a* and the first baffle body 50*a*, one side of the first baffle driven end 52*a* is provided with a first baffle driven end slot 53*a*, the first baffle driven end slot 53*a* is drivingly connected with the linkage 7*a*, and a lower side of the first baffle body 50*a* is provided with a first baffle body slot 54*a*. The second baffle 6*a* includes a second baffle body 60*a* and a second baffle body slot 61*a* arranged on a lower side of the second baffle body 60*a*. The second transmission rod 8*a* includes a second transmission rod trunk 80*a*, a second transmission rod driven end 82*a*, and a second transmission rod driving end 81*a*, the second transmission rod trunk 80*a* is pivotally arranged on the circuit breaker housing 2, the second transmission rod driven end 82*a* is drivingly connected with the first baffle body slot 54*a*, and the second transmission rod driving end 80*a* is drivingly connected with the second baffle body slot 61*a*.

Preferably, the second transmission rod driven end 82*a* and the second transmission rod driving end 81*a* both have a cylindrical structure, and are both perpendicularly connected with the second transmission rod trunk 80*a*.

Preferably, the first baffle driven end 52*a* and the first baffle body 50*a* are perpendicularly connected with the first baffle connecting arm 51*a* respectively. Further, an extending direction of the first baffle driven end slot 53*a* is perpendicular to an extending direction of the first baffle connecting arm 51*a*, an extending direction of the first baffle body slot 54*a* is perpendicular to the extending direction of the first baffle connecting arm 51*a*, and the extending direction of the first baffle driven end slot 53*a* is perpendicular to the extending direction of the first baffle body slot 54*a*. Specifically, in a direction shown in FIG. 15, the first baffle driven end slot 53*a* extends vertically, and the first baffle body slot 54*a* extends horizontally. The extending direction of the first baffle driven end slot 53*a* is perpendicular to the extending direction of the first baffle body slot 54*a*.

Preferably, a middle portion of the second transmission rod trunk 80*a* is provided with a second transmission rod pivot 83*a*, a second transmission rod pivot hole 28 is arranged in a communication place between the first sliding cavity 27 and the second sliding cavity 26 of the circuit breaker housing 2, and the second transmission rod pivot 83*a* is rotatably arranged in the second transmission rod pivot hole 28.

FIG. 14 and FIG. 15 show an embodiment of the linkage 7*a* of the present invention.

The linkage 7*a* has a V-shaped structure, a middle portion thereof is arranged on the circuit breaker housing 2*a*, and the linkage 7*a* includes a linkage driven arm 71*a* and a linkage driving arm 70*a*. A middle portion of the linkage driven arm 71*a* is provided with a linkage driven arm slot 73*a*, and the linkage driving arm 70*a* is provided with a linkage driving column 72*a*. The button mechanism 1 includes a button driving column, the button driving column is drivingly connected with the linkage driven arm slot 73*a*, and the linkage driving column 72*a* is drivingly connected with the first baffle driven end slot 53*a*.

It should be pointed out that, as shown in FIG. 14 and FIG. 15, the button mechanism 1 may not be separately provided with the button driving column, and the first connecting rod 1050 passes through the transmission rod installation table 12 of the button mechanism 1 and is drivingly connected with the linkage 7*a*. The above connecting manner is conductive to simplifying a structure of the button mechanism 1, thus reducing a production cost.

In a direction shown in FIG. 12, the button mechanism 1 is pressed, and the button mechanism 1 makes the linkage 7*a* rotate clockwise through the button driving column or the first connecting rod 1050. When the button mechanism 1 is reset, the button mechanism 1 drives the linkage 7*a* to rotate counterclockwise through the button driving column or the first connecting rod 1050 to restore an initial state of the linkage 7*a*.

Figure 16:
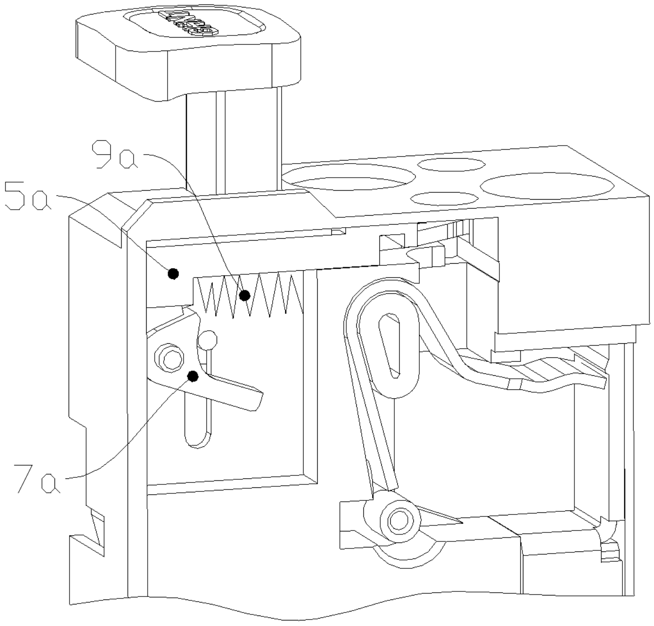
FIG. 16 is a schematic structural diagram of the indicating apparatus of the present invention, which shows an assembly relationship between an indicating apparatus reset member and the first baffle.
Figure 17:
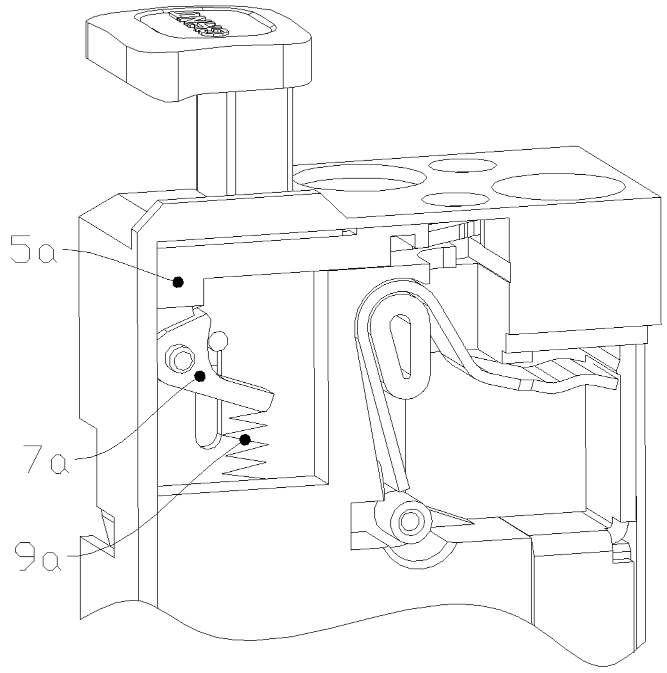
FIG. 17 is a schematic structural diagram of the indicating apparatus of the present invention, which shows an assembly relationship between the linkage and the indicating apparatus reset member.

FIG. 16 and FIG. 17 show another embodiment of the linkage 7*a* of the present invention.

The linkage 7*a* has a V-shaped structure, a middle portion thereof is arranged on the circuit breaker housing 2*a*, and the linkage 7*a* includes a linkage driven arm 71*a* and a linkage driving arm 70*a*. The linkage driven arm 71*a* is in contact connection with the button driving column of the button mechanism 1 or in contact connection with one end of the first connecting rod 1050. The linkage driving arm 70*a* is provided with a linkage driving column 72*a*, and the linkage driving column 72*a* is drivingly connected with the first baffle driven end slot 53*a*. Specifically, one end of the button driving column or the first connecting rod 1050 is arranged on an upper side of the linkage driven arm 71*a* and is drivingly connected with the linkage driven arm.

The indicating apparatus further includes an indicating apparatus reset member 9*a*, and the indicating apparatus is reset under an action of the indicating apparatus reset member 9*a*, thus avoiding the wire removal hole 201. Preferably, the indicating apparatus reset member 9*a* is a reset spring, one end of the indicating apparatus reset member is connected with the circuit breaker housing 2, and the other end of the indicating apparatus reset member is connected with the linkage driven arm 71*a* of the linkage 7*a* or the first baffle 5*a*.

As shown in FIG. 16 and FIG. 17, the button mechanism 1 is pressed, and the button mechanism 1 makes the linkage 7*a* rotate clockwise through the button driving column or the first connecting rod 1050. When the button mechanism 1 is reset, the reset spring makes the linkage 7*a* rotate counterclockwise to restore an initial state of the linkage 7*a*.

It should be pointed out that an indicating hole (not shown in the drawings) may also be separately arranged in one side of the circuit breaker housing 2, so that the indicating apparatus is matched with the indicating hole to indicate the switching-on state or switching-off state of the circuit breaker. The indicating apparatus is in linkage fit with the button mechanism. When the button mechanism is pressed to switch on the miniature circuit breaker, the indicating apparatus moves to the indicating hole and shields the indicating hole, and after the button mechanism is reset, the indicating apparatus leaves the indicating hole. In the embodiment, the wire removal hole 201 is used as the indicating hole, the wire removal hole may be effectively used, and the wire removal hole may be shielded by the indicating apparatus to prevent the wire removal hole from being operated when the circuit breaker is in the switching-on state.

As shown in FIG. 2, the outlet end 100 includes a conductive plate 102 and an elastic member 101. The conductive plate 102 is fixedly arranged on the circuit breaker housing 2, the elastic member 101 includes an elastic member fixed end 1011 and an elastic member wire pressing end 1010, the elastic member fixed end 1011 is fixedly arranged on the circuit breaker housing 2, the elastic member wire pressing end 1010 is in elastic contact with the conductive plate 102, and the elastic member wire pressing end 1010 is arranged corresponding to a set of wire insertion hole 208 and wire removal hole 201. An external wire passes through the wire insertion hole 208 to be inserted between the elastic member wire pressing end 1010 and the conductive plate 102, a reset force of the elastic member wire pressing end 1010 presses the external wire between the elastic member wire pressing end 1010 and the conductive plate 102, and a pressure is applied to the elastic member wire pressing end 1010 through the wire removal hole 201 to separate the elastic member wire pressing end from the external wire, which means that the external wire is pulled out of the wire insertion hole 208. Preferably, as shown in FIG. 2, the circuit breaker housing 2 further includes an elastic member fixing column 105 arranged thereon, an arc-shaped elastic member installation groove is formed between the elastic member fixing column 105 and the circuit breaker housing 2, and the elastic member fixed end 1011 is connected with the elastic member wire pressing end 1010 through an arc-shaped bending structure 1012. The arc-shaped bending structure 1012 is arranged in the elastic member installation groove. Further, as shown in FIG. 12 and FIG. 13, an upper end of the conductive plate 102 is provided with an elastic member limit protrusion, and the elastic member limit protrusion is in limit fit with the elastic wire pressing end 1010. Specifically, as shown in FIG. 1 and FIG. 2, a left side of the button mechanism 1 is provided with an outlet end wiring cavity, and an upper end of the outlet end wiring cavity is provided with the wire insertion hole 208 and the wire removal hole 201. The conductive plate 102 is fixedly arranged at a lower right corner of the outlet end wiring cavity, the elastic member fixing column 105 is arranged at an upper left corner of the outlet end wiring cavity, and the arc-shaped elastic member installation groove is formed between the elastic member fixing column 105 and the circuit breaker housing 2. The arc-shaped bending structure 1012 of the elastic member 101 is arranged in the elastic member installation groove, a lower end of the elastic member fixed end 1011 is in elastic contact with the circuit breaker housing 2, and a right end of the elastic member wire pressing end 1010 is in elastic contact with the conductive plate 102 and is in limit fit with the elastic member limit protrusion.

FIG. 18 and FIG. 20 show an embodiment of the circuit breaker housing 2 of the present invention.

In a direction shown in FIG. 18, the circuit breaker housing 2 of the present invention has a cuboid structure approximately. The circuit breaker housing 2 includes a front end face and a rear end face which are oppositely arranged, a left side face and a right side face which are oppositely arranged, and an upper surface and a lower surface which are oppositely arranged. The circuit breaker housing 2 includes a wire insertion hole 208, a wire removal hole 201, an operating member installation hole 1020, a first opening hole 203, a second opening hole 204, an inlet hole 21*a*, and a signal wire connecting hole 22*a*. The operating member installation hole 1020 is arranged at an upper end of the front end face of the circuit breaker housing 2 for installing the operating member. Two wire insertion holes 208 and two wire removal holes 201 are arranged on the front end face of the circuit breaker housing 2 and are located below the operating member installation hole 1020. The wire insertion hole 208 on the left side and the wire removal hole 201 on the left side are a set, and are matched with one outlet end 100 for used. The wire insertion hole 208 on the right side and the wire removal hole 201 on the right set are a set, and are matched with the other outlet end 100 for use. The first opening hole 203 is matched with the first locking member 3 of the anti-switching-on mechanism for making the first locking member protrusion 30 of the first locking member 3 pass through the first opening hole 203 and protrude from an upper side of the circuit breaker housing 2. The second opening hole 204 is matched with the second locking member 4 of the locking mechanism for making the second locking member protrusion 40 of the second locking member 4 pass through the second opening hole 204 and protrude from an upper side of the circuit breaker housing 2, which is in limited fit with the external housing of the installed position for the circuit breaker. Two inlet holes 21*a* are respectively arranged in the rear end face of the circuit breaker housing 2, the two inlet holes 21*a* are spaced up and down and are respectively located at upper and lower ends of the rear end face, and the signal wire connecting hole 22*a* is arranged between the two inlet holes 21*a*. A plug-in wiring terminal is arranged in the inlet hole 21*a*, which is specifically the inlet end 8 to facilitate plug-in matching with the external wire when the circuit breaker is installed to the installed position for the circuit breaker. It should be pointed out that the inlet end 8 may also be located on one side of the front end face, and the outlet end 100 is arranged on one side of the rear end face.

It should be pointed out that one-pole circuit breaker corresponds to one inlet end and one outlet end. In the embodiment, two-pole circuit breakers are provided, including an L-pole circuit breaker and an N-pole circuit breaker. N-pole circuit breakers have no moving contact and static contact, and directly connect inlet ends and outlet ends of the corresponding N-pole circuit breakers by a conductor.

As shown in FIG. 6, an adjusting screw installation hole 212 is arranged in a lower surface of the circuit breaker housing 2, and the adjusting screw is assembled on the circuit breaker housing 2 through the adjusting screw installation hole 212 and contacts with a bimetallic strip of the overload protection mechanism 9 for adjusting a position of the bimetallic strip.

Preferably, as shown in FIG. 18, an installation guide positioning step 214 is arranged on the left side face and/or the right side face, and the installation guide positioning step 214 protrudes from the left side face and/or the right side face. In a process of installing the miniature circuit breaker to the installed position for the circuit breaker and installing the miniature circuit breaker in place, the installation guide positioning step 214 is matched with the external housing of the installed position for the circuit breaker for guiding, so as to prevent the miniature circuit breaker from being misassembled. Specifically, the installation guide positioning step 214 includes a first step 2141 and a second step 2142, a distance between the first step 2141 and the front end face is larger than that between the second step 2142 and the front end face, an upper end of the first step 2141 is connected with an upper surface of the circuit breaker housing 2, and a lower end of the second step 2142 is connected with a lower surface of the circuit breaker housing 2. Further, the first step 2141 and the second step 2142 are arranged in parallel, and the first step and the second step are both parallel to the front end face and the rear end face.

Preferably, as shown in FIG. 12 to FIG. 18, the miniature circuit breaker further includes an indicating apparatus, and the indicating apparatus is in driving fit with the operating member. In the embodiment, the indicating apparatus is in driving fit with the operating member, and when the miniature circuit breaker is switched on, the operating member drives the indicating apparatus to shield the wire removal hole 201. Further, the indicating apparatus may be the above indicating apparatus. Further, the operating member may be the button mechanism 1 or the operating handle.

Preferably, as shown in FIG. 18, the left and right sides of the operating member installation hole 1020 are respectively provided with a protection boss 20*a*, so as to reduce collision of the operating member by an external object, thus being conductive to prolonging a service life of the operating member. Preferably, one protection boss 20*a* is arranged at the front end of the left side face of the circuit breaker housing 2, and the other protection boss 20*a* is arranged at the front end of the right side face of the circuit breaker housing 2.

The above is the further detailed descriptions of the present invention with reference to the specific preferred implementations, and the specific implementations of the present invention cannot be considered as being limited to these descriptions. Those of ordinary skills in the art of the present invention may further make several simple deductions or substitutions without departing from the concept of the present invention, and these deductions or substitutions should be regarded as belonging to the scope of protection of the present invention.

The invention claimed is:

1. A miniature circuit breaker, comprising:
a button mechanism,
a circuit breaker housing, and
an anti-switching-on mechanism,
wherein the button mechanism is arranged at one end of the circuit breaker housing and is in sliding fit with the circuit breaker housing, the anti-switching-on mechanism comprises a first locking member, the first locking member is pivotally arranged on the circuit breaker housing, one end of the first locking member is in locking fit with the button mechanism to prevent the button mechanism from moving towards a switching-on direction, and after the miniature circuit breaker is installed in place to an installed position for the circuit breaker, an external housing of the installed position for the circuit breaker acts on the first locking member, so that after the first locking member is unlocked from the button mechanism, the button mechanism is capable of moving towards the switching-on direction for a switching-on operation; and
wherein the button mechanism comprises a button head, a button body, and a first connecting rod, the button head is located on one side of the button body for a user to operate the button mechanism, the first connecting rod is in transmission connection with the button body, one end of the first connecting rod is inserted into the button body, the other end of the first connecting rod is connected with an operating mechanism, the first locking member is in locking fit with the first connecting rod, which prevents the button mechanism from moving towards the switching-on direction, and when the anti-switching-on mechanism is unlocked from the first connecting rod, the button mechanism is capable of moving towards the switching-on direction and performing the switching-on operation, the button mechanism drives the operating mechanism to act through the first connecting rod, thus connecting a moving contact with a static contact.

2. The miniature circuit breaker according to claim 1, wherein the first connecting rod is a U-shaped rod, a transmission rod installation table is arranged on the button body, one end of the first connecting rod passes through the transmission rod installation table and forms a first transmission rod protruding from one side of the transmission rod installation table, and the first locking member is in locking fit with the first transmission rod.

3. The miniature circuit breaker according to claim 1, wherein the anti-switching-on mechanism further comprises a first locking spring, the first locking member comprises a first locking member body, and a first locking member protrusion and a first locking member stop arm which are respectively arranged at two ends of the first locking member body, the first locking member body is pivotally arranged on the circuit breaker housing, the circuit breaker housing comprises a first opening hole arranged in one side thereof, the first locking spring makes the first locking member stop arm in locking fit with the first connecting rod, and makes the first locking member protrusion pass through the first opening hole and protrude outside the circuit breaker housing, and after the miniature circuit breaker is installed in place to the installed position for the circuit breaker, the external housing of the installed position for the circuit breaker presses the first locking member protrusion to move into the circuit breaker housing, so that the first locking member stop arm is unlocked from the first connecting rod.

4. The miniature circuit breaker according to claim 1, further comprising a locking mechanism, wherein the locking mechanism comprises a second locking member and a second locking spring, the second locking member comprises a second locking member body, and a second locking member protrusion and a second locking member driving arm which are respectively arranged at two ends of the second locking member body, the second locking member body is pivotally installed on the circuit breaker housing, the circuit breaker housing comprises a second opening hole arranged in one side thereof, the second locking member driving arm is in driving fit with the first connecting rod, the second locking spring makes the second locking member protrusion pass through the second opening hole and protrude outside the circuit breaker housing, after the miniature circuit breaker is installed in place to the installed position for the circuit breaker, the second locking member protrusion passes through the second opening hole and is in limit fit with the external housing of the installed position for the circuit breaker, when the button mechanism is pulled to move out of the circuit breaker housing, the first connecting rod drives the second locking member driving arm to rotate, so that the second locking member protrusion moves into the circuit breaker housing, and the second locking member is released from the installed position for the circuit breaker.

5. The miniature circuit breaker according to claim 4, wherein the first locking member body and the second locking member body of the first locking member are arranged side by side, and the first locking member and the second locking member are both pivotally installed on the circuit breaker housing through a first pivot.

6. The miniature circuit breaker according to claim 4, further comprises a first installation shaft, wherein the first locking spring and the second locking spring of the anti-switching-on mechanism are double torsion springs with an integrated structure, the double torsion springs are sleeved on the first installation shaft, and comprise first ends of the double torsion springs connected with the first locking member body, second ends of the double torsion springs connected with the second locking member body, and third ends of the double torsion springs connected with the circuit breaker housing; the first locking member comprises a first locking spring limit protrusion arranged on one side of the first locking member body, the second locking member comprises a second locking spring limit protrusion arranged on one side of the second locking member body, the first ends of the double torsion springs are in limit fit with the first locking spring limit protrusion, and the second ends of the double torsion springs are in limit fit with the second locking spring limit protrusion.

7. The miniature circuit breaker according to claim 1, wherein a first limit boss is also arranged on the button body, and the first limit boss is in contact fit with the circuit breaker housing.

8. The miniature circuit breaker according to claim 1, wherein the operating mechanism comprises a transmission member, a second connecting rod, a catch member, a supporting member, a buckle member, and a first reset spring, the transmission member and the supporting member are pivotally arranged on the circuit breaker housing respectively, the supporting member is elastically connected with the circuit breaker housing through the first reset spring, the catch member and the buckle member are pivotally arranged on the supporting member respectively, the button mechanism is drivingly connected with the transmission member through the first connecting rod, the transmission piece is drivingly connected with the catch member through the second connecting rod, the catch member is in catch fit with the buckle member, the buckle member is in driving fit with the supporting member, and the supporting member is connected with the moving contact.

9. The miniature circuit breaker according to claim 8, wherein the operating mechanism further comprises a switching-off rod, the switching-off rod comprises a switching-off rod connecting end and a switching-off rod driving end, the switching-off rod connecting end is connected with the button mechanism, and the switching-off rod driving end is in driving fit with the buckle member; when the miniature circuit breaker is in an switching-off state, the catch member is in catch fit with the buckle member, the button mechanism is pressed, so that the operating mechanism drives the moving contact to be connected with the static contact, the miniature circuit breaker enters the switching-on state, the button mechanism is pressed again, the switching-off rod driving end drives the buckle to rotate, so that the buckle member is unlocked from the catch member, the operating mechanism is buckled, the supporting member drives the moving contact to be disconnected from the static contact, and the miniature circuit breaker enters a switching-off state.

10. The miniature circuit breaker according to claim 9, wherein the operating mechanism further comprises a button mechanism reset member, and a guide boss and a guide groove set which are matched with the switching-off rod and arranged on the circuit breaker housing; the guide groove set comprises a first guide groove, a second guide groove, a third guide groove, a fourth guide groove, and a fifth guide groove, and the first guide groove, the second guide groove, the third guide groove, the fourth guide groove, and the fifth guide groove are connected end to end to form the annular guide groove set surrounding the guide boss;

when the miniature circuit breaker is in the switching-off state, the button mechanism is pressed, the switching-off rod driving end of the switching-off rod passes through the first guide groove and then the second guide groove to enter the third guide groove, the miniature circuit breaker enters the switching-on state, the button mechanism is released, the button mechanism reset member drives the switching-off rod driving end to pass through the third guiding groove to enter the fourth guiding groove through the button mechanism, and the switching-off rod driving end is in limit fit with the guide boss; and the button mechanism is pressed again, the button mechanism drives the buckle member to rotate through the switching-off rod driving end, the buckle member is unlocked from the catch member, the operating mechanism is buckled, the operating mechanism drives the button mechanism to reset, the button mechanism drives the switching-off driving end to pass through the fourth guide groove and then the fifth guide groove to enter the first guide groove, so that the miniature circuit breaker enters the switching-off state.

* * * * *